United States Patent
Healey et al.

(10) Patent No.: US 11,561,750 B2
(45) Date of Patent: Jan. 24, 2023

(54) RETRIEVING PERSONALIZED VISUAL CONTENT ITEMS IN REAL TIME FOR DISPLAY ON DIGITAL-CONTENT-DISPLAY DEVICES WITHIN A PHYSICAL SPACE

(71) Applicant: Adobe Inc., San Jose, CA (US)

(72) Inventors: Jennifer Healey, San Jose, CA (US); Haoliang Wang, San Jose, CA (US); Georgios Theocharous, San Jose, CA (US)

(73) Assignee: Adobe Inc., San Jose, CA (US)

( * ) Notice: Subject to any disclaimer, the term of this patent is extended or adjusted under 35 U.S.C. 154(b) by 166 days.

(21) Appl. No.: 17/091,335

(22) Filed: Nov. 6, 2020

(65) Prior Publication Data

US 2022/0147300 A1  May 12, 2022

(51) Int. Cl.
 *G06Q 30/00* (2012.01)
 *G06F 3/14* (2006.01)
 *G06Q 30/06* (2012.01)
 *G06Q 10/08* (2012.01)
 *G06K 7/10* (2006.01)
 (Continued)

(52) U.S. Cl.
 CPC ......... *G06F 3/1423* (2013.01); *G01C 21/206* (2013.01); *G06F 16/535* (2019.01); *G06F 16/54* (2019.01); *G06F 40/279* (2020.01); *G06K 7/10297* (2013.01); *G06K 19/0723* (2013.01); *G06Q 10/087* (2013.01); *G06Q 20/208* (2013.01); *G06Q 30/0261* (2013.01); *G06Q 30/0269* (2013.01); *G06Q 30/0631* (2013.01);
 (Continued)

(58) Field of Classification Search
 None
 See application file for complete search history.

(56) References Cited

U.S. PATENT DOCUMENTS

2008/0249865 A1\* 10/2008 Angell ............... G06Q 30/0277
  705/14.51
2008/0308630 A1\* 12/2008 Bhogal ................. G07G 1/009
  235/383

(Continued)

OTHER PUBLICATIONS

Aerva.com; "BP Connect—Retail Digital Signage"; Date downloaded Nov. 19, 2020; https://aerva.com/clients/bp-connect.

(Continued)

*Primary Examiner* — Mila Airapetian
(74) *Attorney, Agent, or Firm* — Keller Preece PLLC

(57) ABSTRACT

This disclosure describes embodiments of methods, systems, and non-transitory-computer readable media that personalize visual content for display on digital signage near a projected location of a person by mapping visual content to physical items selected by the person. In some examples, the disclosed system identifies physical items selected by a person based on signals from the physical items, such as signals emitted by RFID tags affixed to (or other devices associated with) the physical items. The disclosed system analyzes the collection of physical items—as identified by the signals—to tailor digital signage content specific to the person. The disclosed system further tracks the location of the person as the person moves through a physical space and interacts with the physical items. Based on the tracked positions, the disclosed system determines a digital sign in proximity to a predicted location of the person to display the personalized visual content.

20 Claims, 13 Drawing Sheets

(51) Int. Cl.
    *G06K 19/07*    (2006.01)
    *G06Q 30/02*    (2012.01)
    *G06F 16/54*    (2019.01)
    *G06F 16/535*   (2019.01)
    *G01C 21/20*    (2006.01)
    *G06F 40/279*   (2020.01)
    *G06Q 20/20*    (2012.01)

(52) U.S. Cl.
    CPC ..... *G06Q 30/0633* (2013.01); *G06Q 30/0639* (2013.01); *G06Q 30/0643* (2013.01); *G06K 2007/10504* (2013.01)

(56) References Cited

U.S. PATENT DOCUMENTS

| | | | | |
|---|---|---|---|---|
| 2014/0019300 | A1* | 1/2014 | Sinclair | G06Q 30/0641 |
| | | | | 705/26.9 |
| 2017/0300999 | A1* | 10/2017 | Wilkinson | G06Q 90/00 |
| 2021/0082024 | A1* | 3/2021 | Sivan | G06K 7/1413 |

OTHER PUBLICATIONS

Aerva.com; "Ignite OPX—The Next Generation"; Date downloaded Nov. 19, 2020; https://aerva.com/software.

nGage Digital Services; "nGage: Digital Signage" Date downloaded Nov. 19, 2020; http://www.ngage.services.

meldCX; "The best way to build, deploy and manage commercial apps"; Date downloaed Nov. 19, 2020; https://www.meldcx.com.

Axis Communications; "Axis cross-functional use of video in retail" Date downloaded Nov. 19, 2020; https://www.youtube.com/watch?v=Ea9LB5-_QYE&ab_channel=AxisCommunications.

Axis Communications; "AXIS Demographic Identifier: Smart analytics for determining gender and age" Date downloaded Nov. 19, 2020; https://www.axis.com/en-us/products/axis-demographic-identifier#:~:text=AXIS%20Demographic%20Identifier%20determines%20the,targeted%20marketing%20and%20merchandising%20decisions.

Axis Communications; "AXIS Direction Detector: Smart analytics for entrance and exit control" Date downloaded Nov. 19, 2020; https://www.axis.com/en-us/products/axis-direction-detector.

Advantech; "UShop+ Cloud Platform for Retailers"; Date downloaded Nov. 19, 2020; https://www.advantech.com/ushop-plus.

Advantech; "UShop+"—Store Traffic Analytics Solution; Date downloaded Nov. 19, 2020; https://www.youtube.com/watch?v=AnRov8cfoDM&ab_channel=Advantech.

Campaign; "Look At Me: Women's Aid interactive billboard"; Date downloaded Nov. 19, 2020; https://www.youtube.com/watch?v=wEybVOerb9Q#action=share&ab_channel=Campaign.

* cited by examiner

RETRIEVING PERSONALIZED VISUAL CONTENT ITEMS IN REAL TIME FOR DISPLAY ON DIGITAL-CONTENT-DISPLAY DEVICES WITHIN A PHYSICAL SPACE

BACKGROUND

In recent years, both hardware and software have improved the display of images, videos, or other visual content on digital signs. Such digital signs may include digital billboards, tablets, marquees, menu boards, kiosks, and more. For example, conventional digital signage systems frequently utilize digital signs to publish digital content for targeted groups expected to be at a given location. Often, conventional systems utilize digital signs and displays within various types of physical spaces, such as stores, showrooms, and other public places. Conventional systems often present and update content items via the digital signs.

Notwithstanding these improvements in digital signage, conventional digital signage systems often cannot dynamically select content to display but follow a set schedule or rigid set of rules controlled by a computing model. More specifically, conventional systems often display visual content that is irrelevant to passersby and lack a computing model that can depart from a rigid set of rules. While some conventional systems attempt to display digital content that is specific to a target viewer, such systems often inaccurately categorize or label the targeted viewer or compromise digital security by capturing personal information.

For instance, some conventional digital signage systems utilize cameras to capture images of a passing person's face and infer attributes about the passing person. But such conventional systems often cannot collect accurate biometric data. To effectively collect biometric information, cameras must often be positioned to capture a person's face. Even when carefully positioned, cameras often fail to collect usable data for people whose faces are obscured (e.g., by other people, objects, clothing), not captured at the correct angle (e.g., from a side view), or are not entirely in frame.

In addition to technical obstacles to capturing biometric data, conventional digital signage systems often can infer only a limited set of attributes from information captured by camera. For example, conventional systems often fail to infer attributes beyond a person's gender and age. Thus, conventional systems often face difficulty in tailoring displayed content for a person based on flawed biometric data and at the cost of capturing personal information that must be encrypted or otherwise protected against digital security breaches.

Some conventional digital signage systems attempt to further personalize displayed digital content by accessing personal data from secure computing sources. For instance, conventional systems often utilize personal data accessed via computing devices associated with a person. However, conventional systems that access user computing devices often face privacy and other data security issues. In particular, conventional systems often face concerns in privacy when accessing a user's profile to retrieve personal information, such as the person's interests, name, age, gender, and related data. Furthermore, conventional systems must often store accessed and recorded information that creates a digital security risk.

Furthermore, due in part to the reliance on limited data, conventional digital signage systems often rigidly operate on after-the-fact data captured beyond a time window for real-time use and use a generalized computing model that selects content based on averages of such after-the-fact data. For example, some conventional systems collect data for persons, for example, by monitoring items bought at the point of sale. Because conventional systems determine general patterns based on averages from collected data, they are frequently limited to inflexibly displaying the same content designed for general classes of people. Thus, conventional systems are often incapable of dynamically displaying personalized content in real time to individual persons.

BRIEF SUMMARY

This disclosure describes one or more embodiments of systems, methods, and non-transitory computer readable storage media that provide benefits and/or solve one or more of the foregoing problems. In particular, the disclosed systems personalize visual content for display on digital signage by mapping visual content to physical items selected by a person and displaying the visual content on a particular digital sign nearby a projected location of the person. For instance, the disclosed system identifies and categorizes a person based on a collection of physical items selected by the person, such as clothing, toiletries, or other physical products. In some examples, the disclosed system identifies physical items in the collection based on signals from radio-frequency identification (RFID) tags affixed to the physical items or signals from other reflectors or devices associated with the physical items. The disclosed system analyzes the collection of physical items to tailor digital-signage content specific to the people. For example, the disclosed system can infer that a person has a particular age, body type, gender, purpose, or spend level based on the collection of items. In addition to analyzing the selected physical items, the disclosed system tracks the location of the people as they move through a space (e.g., a store) and interact with the or otherwise select physical items. Based on the tracked positions, the disclosed system determines a digital sign in proximity to a predicted location of the people at a predicted time. The disclosed system can accordingly present, at a digital sign in the people's predicted location, personalized digital-signage content in real time.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

DETAILED DESCRIPTION

Figure 1:
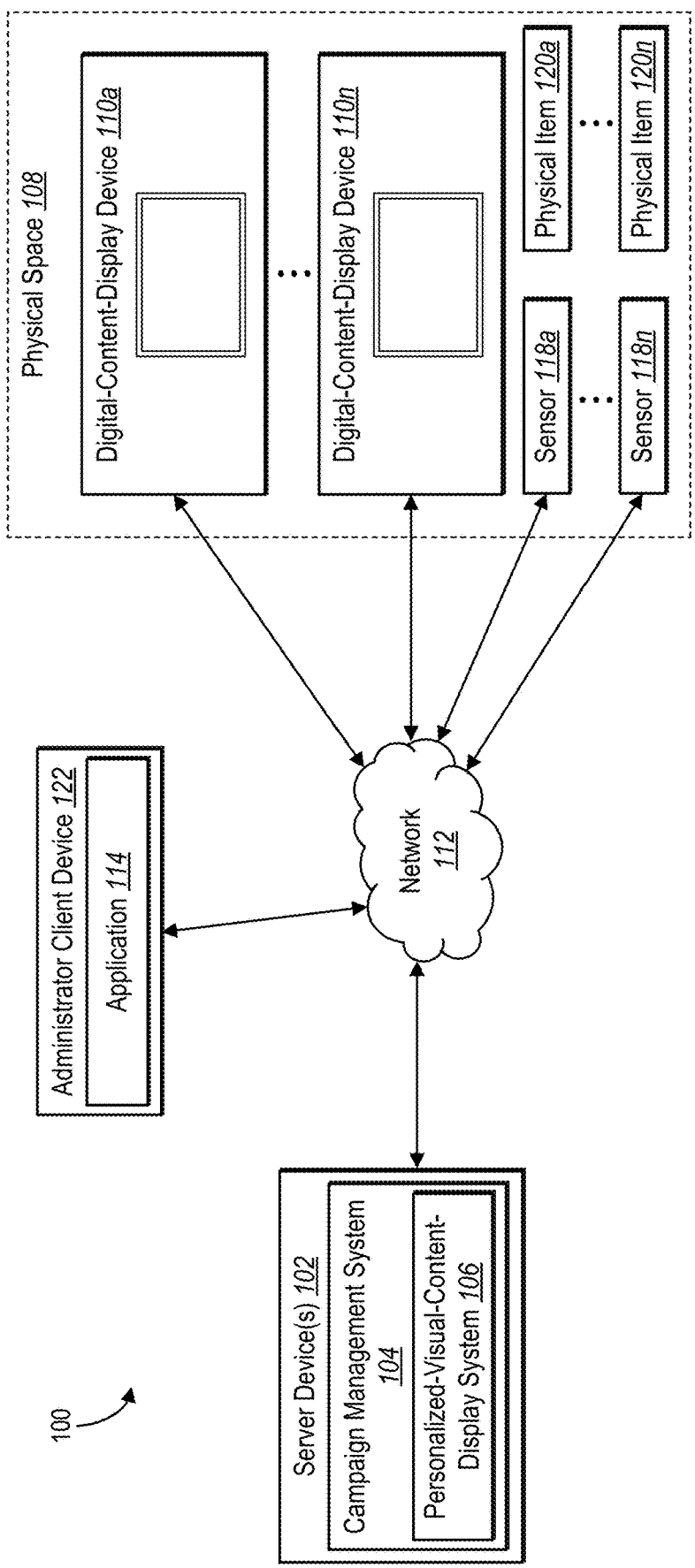
FIG. 1 illustrates an environment in which a personalized-visual-content-display system can operate in accordance with one or more embodiments of the present disclosure.

This disclosure describes one or more embodiments of a personalized-visual-content-display system that (i) retrieves a personalized visual content item for display via a digital-content-display device in real time based on physical items selected by a person and (ii) selects a digital-content-display device nearby a projected location of the person to display the personalized visual content item. In particular, the personalized-visual-content-display system tracks physical items that a person interacts with, carries, or otherwise selects as the person moves through a physical space. In one example, the personalized-visual-content-display system receives signals from tags affixed to (or other devices associated with) individual physical items. The personalized-visual-content-display system analyzes physical items selected by the person to infer characteristics of the person and/or predict other items in which the person has interest. The personalized-visual-content-display system selects a visual content item specific to the person based on analysis of the selected physical items. As the person travels through the physical space, the personalized-visual-content-display system tracks the location of the selected physical items (or the person) and projects a path of the person. Having projected a path and selected a visual content item, the personalized-visual-content-display system identifies a digital-content-display device in the projected path of the person to display the selected visual content item.

To illustrate, in one or more embodiments, the personalized-visual-content-display system determines a set of physical items selected by a person within a physical space based on signals from the set of physical items. The personalized-visual-content-display system also identifies a description of one or more physical items from the set of physical items selected by the person. The personalized-visual-content-display system further determines a projected location of the person within the physical space at a projected time and identifies a digital-content-display device in proximity to the projected location. Based on determining a visual content item corresponds to the description of one or more physical items, the personalized-visual-content-display system retrieves, for display via the digital-content-display device, a visual content item to be viewed by the person at the projected location and at the projected time.

As part of displaying personalized content items via a digital-content-display device, the personalized-visual-content-display system determines identities of physical items within a set of physical items selected by a person. For instance, in some embodiments, a person can place a physical item in a shopping container, such as a basket or cart, move or manipulate a physical item, or otherwise select a physical item to be part of the set of physical items. In one example, the personalized-visual-content-display system determines that individual items traveling together as a group belong to the set of physical items.

As or after the person selects physical items, the personalized-visual-content-display system determines identifiers for individual physical items within the set of physical items. To determine such identifiers, in one example, the personalized-visual-content-display system receives signals from the physical items (e.g., RFID signals from tags affixed to the physical items). Additionally, or alternatively, the personalized-visual-content-display system utilizes computer vision, smart shelving, Quick Response (QR) codes, or other methods to identify physical items. The personalized-visual-content-display system can utilize various sensors and methods (or a combination thereof) to detect signals from the physical items to identify the individual physical items. For instance, in some cases, the personalized-visual-content-display system utilizes sensors located on an item-holding structure, such as a container or shelf. In another example, the personalized-visual-content-display system utilizes sensors comprising RFID readers or other types of wireless communication signal readers.

As mentioned, the personalized-visual-content-display system retrieves a visual content item that is tailored to the person based on the set of physical items selected by the person. In one example, the personalized-visual-content-display system displays a visual content item based on similarities between the visual content item and the set of physical items. In some cases, the personalized-visual-content-display system extracts a set of item features from a set of descriptions corresponding to the set of physical items. The personalized-visual-content-display system also extracts a set of content features from a collection of visual content items. Based on mapping the set of content features to the set of item features, the personalized-visual-contentdisplay system retrieves a visual content item to display to a person on a digital-content-display device. For example, in at least one embodiment, the personalized-visual-content-display system extracts a set of item features by generating item embeddings utilizing a language-embedding model and extracts a set of content features by generating a content embedding utilizing an image-embedding model. The personalized-visual-content-display system maps the set of content features to the set of item features by determining measures of similarities between the content embedding and the item embeddings.

In addition or in the alternative to mapping features to select a visual content item, in some embodiments, the personalized-visual-content-display system utilizes a co-selected-nodal graph to identify a visual content item that is customized to the person. For instance, the personalized-visual-content-display system accesses co-selected-nodal graphs that indicate probabilities that particular physical items are co-selected (e.g., co-viewed and/or co-bought) with the one or more physical items in the set of physical items. Based on historical data from the co-selected-nodal graphs, the personalized-visual-content-display system determines the likelihood that the person will view or select a commonly selected physical item. After selecting such an item, the personalized-visual-content-display system determines to display a visual content item showing the commonly selected physical item.

In addition or in the alternative to using a co-selected-nodal graph to select a visual content item, in one or more embodiments, the personalized-visual-content-display system retrieves personalized visual content items based on inferred characteristics of the person. In at least one example, the personalized-visual-content-display system analyzes the set of physical items and determines characteristics of a person. For instance, the personalized-visual-content-display system infers the person's age, gender, spend level, size, shopping purpose, or other characteristics based on the set of physical items. The personalized-visual-content-display system further identifies and retrieves a visual content item that match characteristics of the person. For example, the personalized-visual-content-display system selects a visual content item that shows a human model similar in age, gender, and/or size to the person.

Beyond tracking and analyzing physical items selected by a person, as indicated above, the personalized-visual-content-display system tracks locations of the selected physical items or the person. For instance, the personalized-visual-content-display system also tracks locations of the set of physical items as it travels within a physical space. In some embodiments, the personalized-visual-content-display system analyzes signals received from the set of physical items to determine the locations. In one example, the personalized-visual-content-display system identifies locations corresponding to electromagnetic signals (e.g., RFID signals) from devices on the set of physical items to track detected locations of the set of physical items. Based on the detected locations, the personalized-visual-content-display system generates a projected path of the person by identifying historical paths of past persons with similar trajectories. Generally, the projected path indicates projected locations that the person will likely go within the space at projected times.

In some embodiments, the personalized-visual-content-display system utilizes the projected path to identify a digital content-display device in the projected path of the person. Based on the projected path, the personalized-visual-content-display system determines a projected location at which the person will arrive at a projected time. The personalized-visual-content-display system utilizes the projected path to identify a digital-content-display device in proximity to a projected location of the person (e.g., closest to the projected location or within a threshold distance). Together with a projected time for the projected location, the personalized-visual-content-display system predicts digital-content-display devices that the person will likely see next or soon within the physical space.

As previously mentioned, the personalized-visual-content-display system provides numerous advantages, benefits, and practical applications over conventional digital signage systems. In particular, the personalized-visual-content-display system more accurately tailors visual content items to individual persons relative to conventional systems as the person travels through a physical space in real time on a nearby digital-content-display device. As mentioned previously, conventional systems are often limited to presenting customized digital content at a point of sale or at some other location for a generalized population. In contrast, the personalized-visual-content-display system accurately projects a future location and a future time at which the person will view a given digital-content-display device. More specifically, the personalized-visual-content-display system analyzes items within the set of physical items in real time to select visual content items that are specifically customized to the person at any given moment as the person travels through a physical space. For example, the personalized-visual-content-display system displays visual content items that are specific to the person's shopping trip, size, age, gender, and other characteristics and customized for a specific projected location that the person will view at a particular projected time.

In addition to improved accuracy of tailored content in real time and physical space, in some embodiments, the personalized-visual-content-display system performs an ordered combination of unconventional actions as part of an algorithm to do something conventional digital signage systems cannot—display customized visual content items to a person in real time as the person moves through a physical space. In particular, the personalized-visual-content-display system integrates RFID signals (or other signals associated with physical items) to determine the identities of physical items selected by a person and combined to form a set of physical items. As part of the ordered combination of actions, in some cases, the personalized-visual-content-display system identifies a visual content item corresponding to the set of physical items by mapping a set of content features from the visual content item to a set of item features from the set of physical items or by utilizing a co-selected-nodal graph to find co-selected items in the visual content item. Rather than rely on human targeting or conventional digital-signage campaigns, therefore, the personalized-visual-content-display system performs an ordered set of unconventional actions to display customized visual content items in real time to a person—based on signals and extractions unrecognizable by humans—as the person moves through a physical space.

Beyond personalized accuracy and an unconventional algorithm to accomplish such personalization, the personalized-visual-content-display system further provides such accuracy without compromising privacy or data of a person. More specifically, in contrast with conventional systems that capture images of a person's face, the personalized-visual-content-display system collects data regarding physical items that a person has selected within a physical space. The personalized-visual-content-display system does so by receiving and analyzing signals associated with the physical items. For instance, the personalized-visual-content-display system receives signals from RFID tags affixed to physical items, smart shelves, or other types of sensors located within the physical space. By analyzing the set of physical items, the personalized-visual-content-display system entirely circumvents the capture and storage of biometric data typically used by conventional systems. Accordingly, the personalized-visual-content-display system avoids encryption, storage, and other security risks often faced by conventional systems.

Independent of improved data security, the personalized-visual-content-display system improves the flexibility with which systems can personalize a visual content item shown on a digital-content-display device in real time for a particular person moving through a physical space. In particular, the personalized-visual-content-display system makes dynamic determinations that are flexible for various situations. In particular, the personalized-visual-content-display system functions flexibly by adapting visual content items to individual persons based on physical items selected by a person as the person moves or interacts with a physical space. For example, the personalized-visual-content-display system dynamically updates projected locations and customized visual content items in real time as the person travels through the physical space. Furthermore, in some embodiments, the personalized-visual-content-display system integrates signals from the physical items to both adjust the selected visual content item as well as determine the projected path of the person. For example, based on determining that a person adds a physical item to the set of items, the personalized-visual-content-display system retrieves (or updates) a visual content item related to the selected item and adjusts the projected path. Unlike conventional systems that are often limited to collecting user data at a final point of sale, the personalized-visual-content-display system offers visual content items relevant to a person's current visit to the physical space.

Additional advantages and benefits of the artistic effect generation system will become apparent in view of the following description. Further, as illustrated by the foregoing discussion, the present disclosure utilizes a variety of terms to describe features and advantages of the artistic effect generation system. The following paragraphs provide additional detail regarding the meaning of such terms.

As used herein, the term "physical item" refers to a physical object that exists in the real world. In particular, a physical item includes a physical and tangible object within a physical space. For example, a physical item includes physical products within a store, a physical good in an inventory, or another type of tangible object within a physical space. Such physical items may be, but are not limited to, physical accessories, books, clothes, electronic devices, toiletries, or any other tangible or physical object in the real world. In some embodiments, physical items are associated with wireless protocol tags. For example, a physical item can be attached to or otherwise associated with an RFID tag, a visual QR code, an ultra-wideband (UWB) transmitter, or other type of wireless protocol tag. In additional or alternative embodiments, physical items are not associated with tags, such as when a camera or computer vision identifies physical items.

As used herein, the term "item feature" refers to a characteristic or attribute of an item. In particular, item features comprise values corresponding to latent and/or patent attributes and characteristics of a physical item within a physical space. In some embodiments, item features comprise words or concepts extracted from a description of a physical item. Additionally, or alternatively, item features comprise vectors (e.g., a series of numbers) extracted from a description of a physical item for a word embedding.

As used herein, the term "description" refers to a textual representation of a physical item. In particular, a description includes a written description of a type of physical item or characteristics or attributes of a physical item. A description for a physical item indicates a sort, kind, or class of a physical item. For example, a description might indicate that a physical item is an article of women's clothing, medicine, an electronic device, or other type of item. Furthermore, in some embodiments, the description provides additional detail regarding the corresponding physical item. For instance, the description can indicate the size, color, style, type, or other attributes of the physical item.

As used herein, the term "physical space" refers to an area that exists in the physical or real world. In particular, a physical space comprises an indoor or outdoor physical demarcated by boundaries that contain physical items. For example, a physical space can comprise a store that includes goods for sale, such as a supermarket, shopping center, drug store, etc. In other embodiments, a physical space includes a structure for storing and organizing inventory such as a warehouse.

As used herein, the term "signal" refers to a current, frequency, pulse, or wave used to carry data from one device to another device. In particular, a signal includes a current, frequency, pulse, or wave that represents data associated with a physical item. In one or more embodiments, signals are emitted or reflected by tags affixed to physical items. In such examples, signals comprise radio signals emitted by RFID and/or UWB tags affixed to physical items. Additionally, or alternatively, signals are emitted by other types of sensors that communicate the status of physical items. For example, signals may be emitted by other types of sensors associated with item-holding structures (e.g., shelves, racks) that indicate that a person has removed a physical item from the item-holding structures.

As used herein, the term "projected location" refers to a predicted location of a person or an object. In particular, a projected location comprises a place along a projected path or trajectory at which a person is predicted to be (or near) at a projected time. In some embodiments, the personalized-visual-content-display system generates a number of projected locations, each associated with a different projected time and in accordance with a projected path of the person.

As used herein, the term "digital-content-display device" (or simply "display device") refers to a computing device that displays digital content. In particular, a digital-content-display device can include a computing device having a digital display for displaying and/or playing visual content items. In some implementations, a digital-content-display device houses and implements the personalized-visual-content-display system. In alternative embodiments, the digital-content-display device is located remotely from the personalized-visual-content-display system and displays visual content items upon or after receiving them from the personalized-visual-content-display system. In some embodiments, a digital-content-display device displays a visual content item upon receiving a display command from the personalized-visual-content-display system or, alternatively, upon or after receiving the visual content item.

As used herein, the term "visual content item" refers to digital media comprising an image or video. In particular, a visual content item can include digital media stored in a digital file that is transferable between computing devices as well as displayable at a digital-content-display device. For example, a visual content item can include still digital images, digital videos, gifs, or other visual digital media. In some embodiments, visual content items are associated with metadata that reflect attributes and/or content of the visual content items. For example, metadata can describe the content of an image, the date and time when a photograph was taken, and other information.

As used herein, the term a "content feature" refers to a characteristic or attribute of a visual content item. In particular, a content features comprise values corresponding to latent and/or patent attributes and characteristics of a visual content item. In some embodiments, content features comprise words or concepts that describe a visual content item. Additionally, or alternatively, in some cases, content features comprise vectors (e.g., a series of numbers) extracted from a visual content item for an image embedding.

The following disclosure provides additional detail regarding the personalized-visual-content-display system in relation to illustrative figures portraying example embodiments and implementations of the personalized-visual-content-display system. For example, FIG. 1 illustrates a schematic diagram of a system environment (or "environment") 100 in which a personalized-visual-content-display system 106 operates in accordance with one or more embodiments. As illustrated in FIG. 1, the environment 100 includes an administrator client device 122, a server device(s) 102, digital-content-display devices 110a-110n, and sensors 118a-118n connected via a network 112. In particular, the digital-content-display devices 110a-110n, sensors 118a-118n, and physical items 120-120n are located within a physical space 108.

While FIG. 1 shows an embodiment of the personalized-visual-content-display system 106, alternative embodiments and configurations are possible. For example, the environment 100 can include any number of client devices, servers, or other components in communication with the personalized-visual-content-display system 106 via the network 112. As another example, the server device(s) 102 represent a set of connected server devices. As a further example, the digital-content-display devices 110a-110n and the sensors 118a-118n communicate directly with the server device(s) 102, bypassing the network 112 or utilizing a separate and/or additional network.

In some embodiments, the server device(s) 102, the network 112, the digital-content-display devices 110a-110n, and the sensors 118a-118n are communicatively coupled with each other either directly or indirectly. For example, and as shown in FIG. 1, the server device(s) 102 communicates with the various components of the environment 100 via the network 112. Each of the components of the environment 100 communicate via the network 112. The network 112 comprises any suitable network over which computing devices can communicate. Example networks are discussed in additional detail below in relation to FIG. 12.

As illustrated in FIG. 1, the environment 100 includes the server device(s) 102. The server device(s) 102 generate, store, and transmit digital content including software hosted at the server device(s) 102. The server device(s) 102 generate, store, and transmit digital content relating to visual content items including digital video, digital images, digital audio, digital designs, metadata, etc. Furthermore, the server device(s) 102 also receive, store, and transmit digital content relating to physical items within a physical space. In particular, the server device(s) generate, store, and transmit data from the sensors 118a-118n, identities of, and metadata associated with physical items within the physical space 108. Furthermore, in some embodiments, the server device(s) 102 generate, store, receive, and transmit data for neural networks.

As further shown in FIG. 1, the server device(s) 102 include a campaign management system 104. Generally, the campaign management system 104 manages, operates, runs, and/or executes one or more digital content campaigns. In one example, the campaign management system 104 receives, from the administrator client device 122, a collection of visual content items from which the personalized-visual-content-display system 106 selects a visual content item to display via the digital-content-display devices 110a-110n. In some embodiments, the campaign management system 104 provides, for display, particular visual content items as part of specific digital content campaigns. Furthermore, the campaign management system 104 manages digital content campaigns specific to a particular person or type of person. For example, the campaign management system can select specific visual content items to display to a specific person based on data associated with the person. In one embodiment, the campaign management system 104 generates digital campaigns based on a set of physical items associated with a person.

In some cases, the campaign management system 104 operates in connection with one or more applications to generate and modify digital content campaigns. For example, in one or more embodiments, the campaign management system 104 operates in connection with digital content campaign applications, such as ADOBE® EXPERIENCE MANAGER, ADOBE® ADVERTISING CLOUD, ADOBE® ANALYTICS, ADOBE® MARKETING CLOUD, ADOBE® EXPERIENCE CLOUD, and other campaign management applications.

As further illustrated in FIG. 1, the campaign management system 104 includes the personalized-visual-content-display system 106. As described in additional detail below, the personalized-visual-content-display system 106 retrieves personalized visual digital content items for display to a person based on a set of physical items associated with the person. In some embodiments, the personalized-visual-content-display system 106 determines a set of physical items selected by a person within a physical space based on signals from the set of physical items. The personalized-visual-content-display system 106 further identifies descriptions of physical items within the set of physical items. Furthermore, the personalized-visual-content-display system 106 predicts a projected location of the person at a projected time and identifies a digital-content-display device in proximity to the projected location of the person. The personalized-visual-content-display system 106 further retrieves visual content items to be displayed at the digital-content-display device at the projected time based on the visual content item corresponding to the description of one or more physical items from the set of physical items.

As further illustrated in FIG. 1, the environment 100 includes the administrator client device 122. The administrator client device 122 generates, stores, receives, and sends digital data. For example, the administrator client device 122 communicates with the server device(s) 102 via the network 112. The administrator client device 122 illustrated in FIG. 1 comprises various types of client devices. For example, in some embodiments, the administrator client device 122 comprises mobile devices, such as laptops, tablets, mobile telephones, smartphones, etc. In other embodiments, the administrator client device 122 includes non-mobile devices, such as desktops or servers, or other types of client devices. In some embodiments, the administrator client device 122 communicates with the campaign management system 104 via the network 112 to coordinate and execute digital content campaigns. For example, the administrator client device 122 may send, to the server device(s) 102, visual content items that may be displayed via the digital-content-display devices 110a-110n. Additional details with regard to the administrator client device 122 are discussed below with respect to FIG. 12.

The administrator client device 122 illustrated in FIG. 1 includes an application 114. In some embodiments, the application 114 comprises a web application or a native application on the administrator client device 122 (e.g., a mobile application, a desktop application). As illustrated, the application 114 interfaces with the personalized-visual-content-display system 106 to provide digital data relating to digital content campaigns. For example, in one or more embodiments, the application 114 comprises a desktop application that provides features and elements for generating, modifying, and executing digital content campaigns. More specifically, the application 114 enables an administrator associated with the administrator client device 122 to provide a set of visual content items from which the personalized-visual-content-display system 106 selects visual content items.

As further illustrated in FIG. 1, the environment 100 includes the physical space 108. As mentioned previously, the physical space 108 includes the digital-content-display devices 110a-110n, the sensors 118a-118n, and the physical items 120a-120n. In certain implementations, the digital-content-display devices 110a-110n comprise a network of display devices located within the physical space 108. In one example, the digital-content-display devices 110a-110n comprise digital billboards located within a store. The digital-content-display devices 110a-110n receive visual content items from the personalized-visual-content-display system 106 via the network 112 or receive visual content items from a local storage device that interfaces with the digital-content-display device 110a-110n. Furthermore, the digital-content-display devices 110a-110n store, manage, and display visual content items. For example, in one embodiment, the digital-content-display devices 110a-110n receive a number of visual content items for display to different persons. The digital-content-display devices 110a-110n update their user interfaces to present visual content items and update the user interfaces to present additional visual content items at projected times.

The environment 100 also includes the sensors 118a-118n. As illustrated in FIG. 1, the sensors 118a-118n are associated with the physical items 120a-120n, respectively, but can alternatively be unassociated with any particular physical item. The sensors 118a-118n collect, store, and communicate data relating to the physical items 120a-120n. In particular, the sensors 118a-118n communicate with the personalized-visual-content-display system 106 via the network 112. In one example, the sensors 118a-118n comprise radio sensors strategically located throughout the physical space 108. The radio sensors can receive signals (e.g., RFID, UWB) transmitted by tags affixed to the physical items 120a-120n. In another embodiment, the sensors 118a-118n comprise pressure sensors, cameras, or other types of sensors within the physical space 108 that determine identities and locations of the physical items 120a-120n. As mentioned, the sensors 118a-118n communicate, to the personalized-visual-content-display system 106, detected movement of the physical items 120a-120n within the physical space 108.

The environment 100 illustrated in FIG. 1 also includes the physical items 120a-120n. As mentioned, the physical items 120a-120n comprise objects within the physical space 108. In one embodiment, the physical items 120a-120n comprise a set of physical items. More particularly, in one example, the physical items 120a-120n comprise merchandise or products that a person has selected. The person may move with the physical items 120a-120n within the physical space 108 or manipulate or otherwise move the physical items 120a-120n.

Although FIG. 1 depicts the personalized-visual-content-display system 106 located on the server device(s) 102, in some embodiments, the personalized-visual-content-display system 106 is implemented by (e.g., located entirely or in part) on one or more other components of the environment 100. In one example, the personalized-visual-content-display system 106 is implemented entirely (or in part) on the administrator client device 122. In one or more embodiments, the personalized-visual-content-display system 106 is implemented in a variety of different ways across the server device(s) 102, the network 112, the administrator client device 122, and the digital-content-display devices 110a-110n.

In some embodiments, the personalized-visual-content-display system 106 employs machine learning, such as a neural network, to infer what a person who selects a set of physical items is most likely to select or purchase in the future. In particular, in some embodiments, the personalized-visual-content-display system 106 learns parameters for a visual content item retrieval model based on training data comprising items selected and/or purchased by people. The personalized-visual-content-display system 106 utilizes the visual content item retrieval model to generate predicted physical items based on physical items within a set of physical items.

Machine learning refers to the process of constructing and implementing algorithms that can learn from and make predictions on data. In general, machine learning may operate by building models from example inputs, such as image exposure training pairs within a training dataset of images, to make data-driven predictions or decisions. Machine learning can include neural networks (e.g., a natural language processing neural network, a specialized object detection neural network, a concept-based object detection neural network, a known object class detection neural network, an object proposal neural network, an unknown object class detection neural network, a region proposal neural network, a concept embedding neural network, an object mask neural network, an object classification neural network, and/or a selected object attribute detection neural network), data-based models (e.g., a natural language processing model, an unknown object class detection model, an object recognition model, a filtering model, and/or a selection object attribute model), or a combination of networks and models.

FIG. 1 illustrates an example environment in which the personalized-visual-content-display system 106 in accordance with one or more embodiments. In accordance with one or more embodiments, FIG. 2 and the corresponding discussion provide a general overview of the personalized-visual-content-display system 106 personalizing visual content for display on a digital-content-display device by mapping visual content to physical items selected by a person and displaying the visual content on a selected digital-content-display device nearby a projected location of the person. More specifically, FIG. 2 illustrates a series of acts 200 comprising an act 202 of determining a set of physical items, an act 204 of identifying a description of the physical items, an act 206 of determining a projected location for the person, an act 208 of identifying a digital content display device, and an act 210 of retrieving a visual content item for display on the digital-content-display device.

Figure 2:
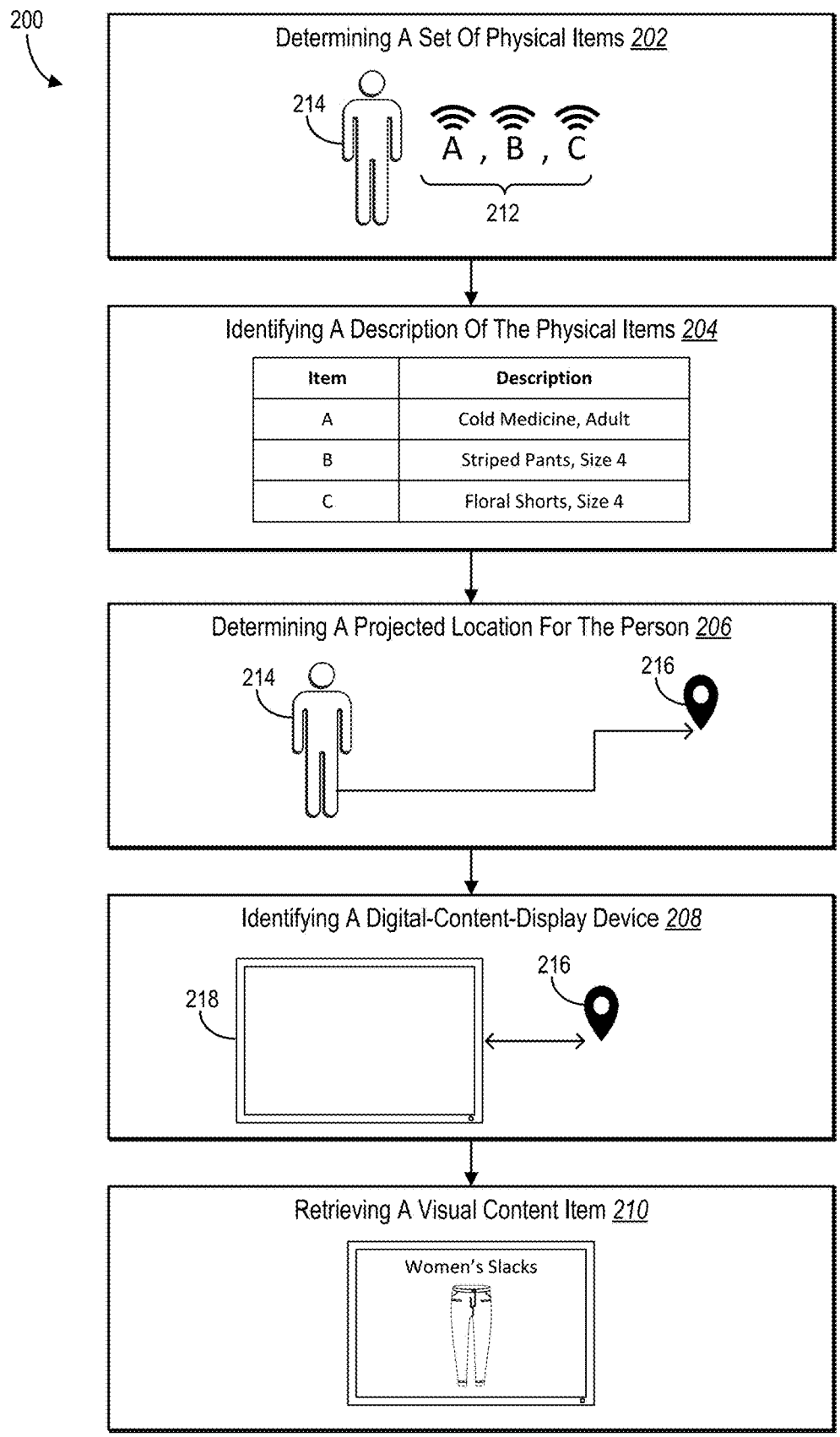
FIG. 2 illustrates an overview of the personalized-visual-content-display system personalizing visual content for display on a digital-content-display device by mapping visual content to physical items selected by a person and displaying the visual content on a selected digital-content-display device nearby a projected location of the person in accordance with one or more embodiments of the present disclosure.

As illustrated in FIG. 2, the personalized-visual-content-display system 106 performs the act 202 of determining a set of physical items. For instance, the personalized-visual-content-display system 106 determines a set of physical items moved, manipulated, or otherwise selected by a person based on signals received from the set of physical items. In some embodiments, the personalized-visual-content-display system 106 receives signals indicating one or both of identifiers for the set of physical items and locations of physical items within the set of physical items 212. In some cases, the personalized-visual-content-display system 106 determines that the physical items A, B, and C have been moved (e.g., into a container or area) or are co-located and thus belong to a set of physical items 212. For example, and as illustrated in FIG. 2, the personalized-visual-content-display system 106 determines that the person 214 has picked up the physical items A, B, and C, and the person 214 is moving through the physical space (e.g., a store) with the physical items.

In one example, as part of performing the act 202, the personalized-visual-content-display system 106 determines that the physical items A, B, and C belong to the set of physical items 212 because the physical items A, B, and C are moving as a set within the physical space. In one embodiment, the personalized-visual-content-display system 106 retrieves, from electromagnetic sensors at various locations within the physical space, indications of electromagnetic signals emitted by electromagnetic tags associated with the set of physical items 212. The personalized-visual-content-display system 106 determines an identifier for each physical item within the set of physical items 212. FIG. 5 and the corresponding discussion provides additional detail regarding how the personalized-visual-content-display system 106 receives signals associated with the set of physical items 212 in accordance with one or more embodiments.

As further illustrated in FIG. 2, the personalized-visual-content-display system 106 performs the act 204 of identifying a description of the physical items. Generally, the personalized-visual-content-display system 106 determines identifiers for the set of physical items 212. In one example, the personalized-visual-content-display system 106 determines identifiers for the set of physical items 212 prior to purchase and/or before the person 214 arrives at a point of sale. In some embodiments, the personalized-visual-content-display system 106 accesses or determines descriptions for one or more physical items from the set of physical items 212. For example, and as illustrated in FIG. 2, the personalized-visual-content-display system 106 determines that the physical item A is associated with the description comprising "cold medicine, adult." The personalized-visual-content-display system 106 can do likewise for each selected physical item.

Figure 6:
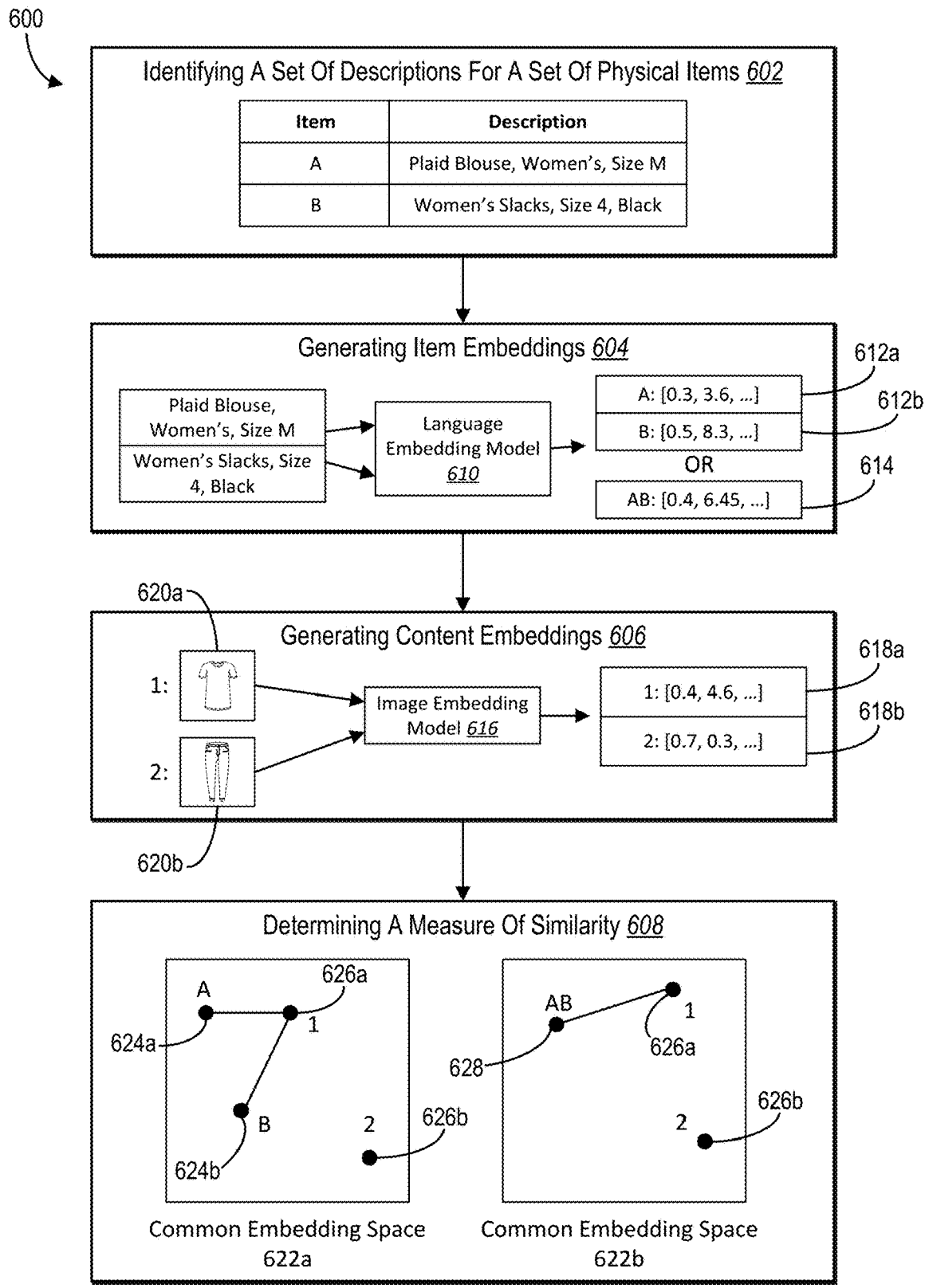
FIG. 6 illustrates an overview of the personalized-visual-content-display system retrieving a visual content item based on item embeddings and content embeddings in accordance with one or more embodiments of the present disclosure.

As indicated above, in one or more embodiments, the personalized-visual-content-display system 106 extracts item features from the descriptions of the one or more physical items from the set of physical items 212—as a basis for later retrieving a visual content item. FIG. 6 and the corresponding discussion provide additional detail regarding how the personalized-visual-content-display system 106 extracts a set of item features from the descriptions of the physical items in accordance with one or more embodiments. In further embodiments, the personalized-visual-content-display system 106 utilizes the descriptions of the physical items to determine characteristics of the person—or accesses a co-selected-nodal graph to determine a commonly selected physical item—as a basis for later retrieving a visual content item.

As further illustrated in FIG. 2, the personalized-visual-content-display system 106 performs the act 206 of determining a projected location 216 for the person 214. Generally, the personalized-visual-content-display system 106 analyzes the past trajectory of the person 214 to predict the future trajectory of the person 214 within the physical space. In some embodiments, the personalized-visual-content-display system 106 generates a projected path of the person 214 within the physical space based on detected locations corresponding to the set of physical items 212. The personalized-visual-content-display system 106 can utilize the same signals analyzed as part of the act 202 in determining the locations corresponding to the set of physical items 212.

Figure 3:
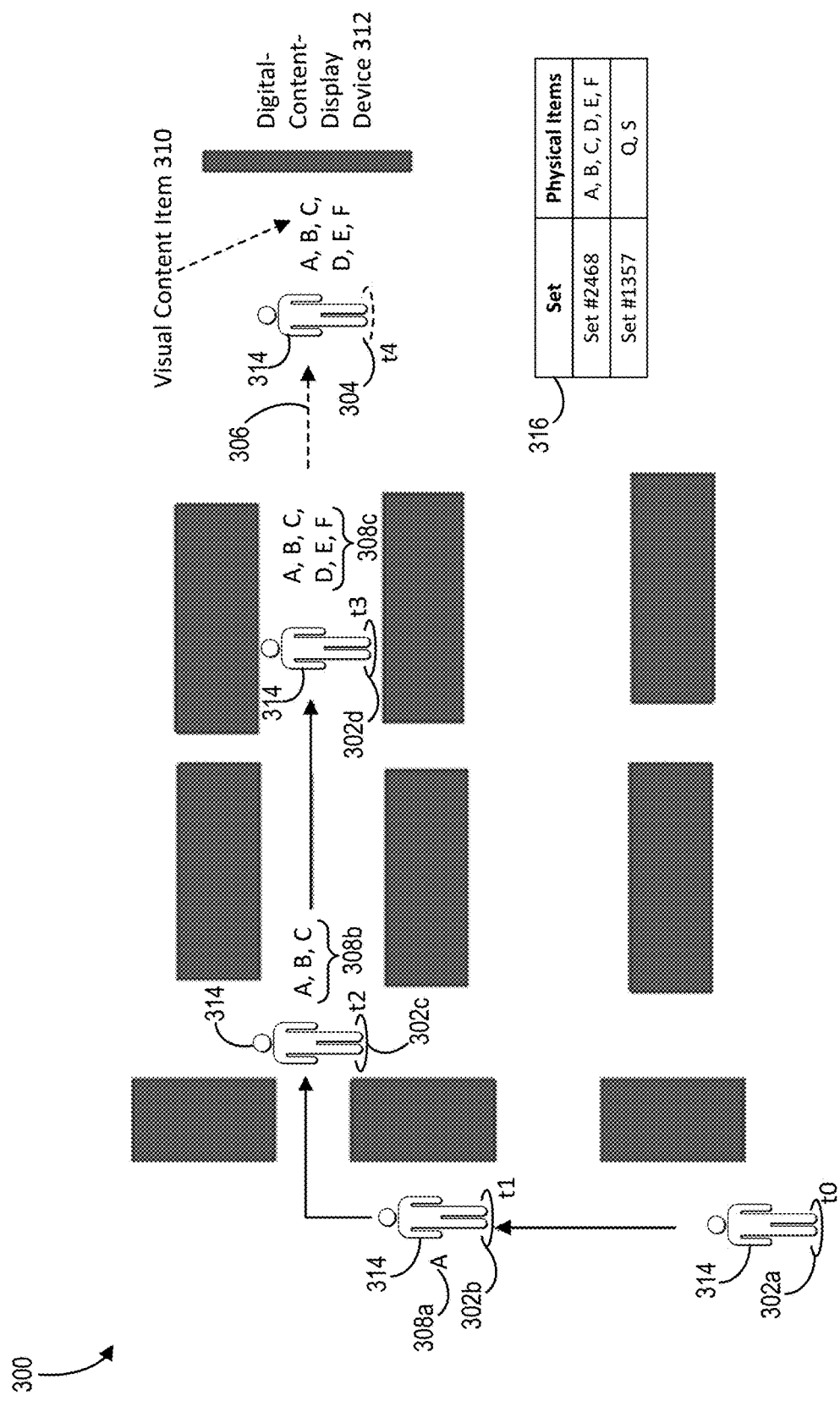
FIG. 3 illustrates an example physical space in which a person interacts with or otherwise selects physical items and in which the personalized-visual-content-display system displays personalized visual content to the person on a digitalcontent-display device in accordance with one or more embodiments of the present disclosure.
Figure 4:
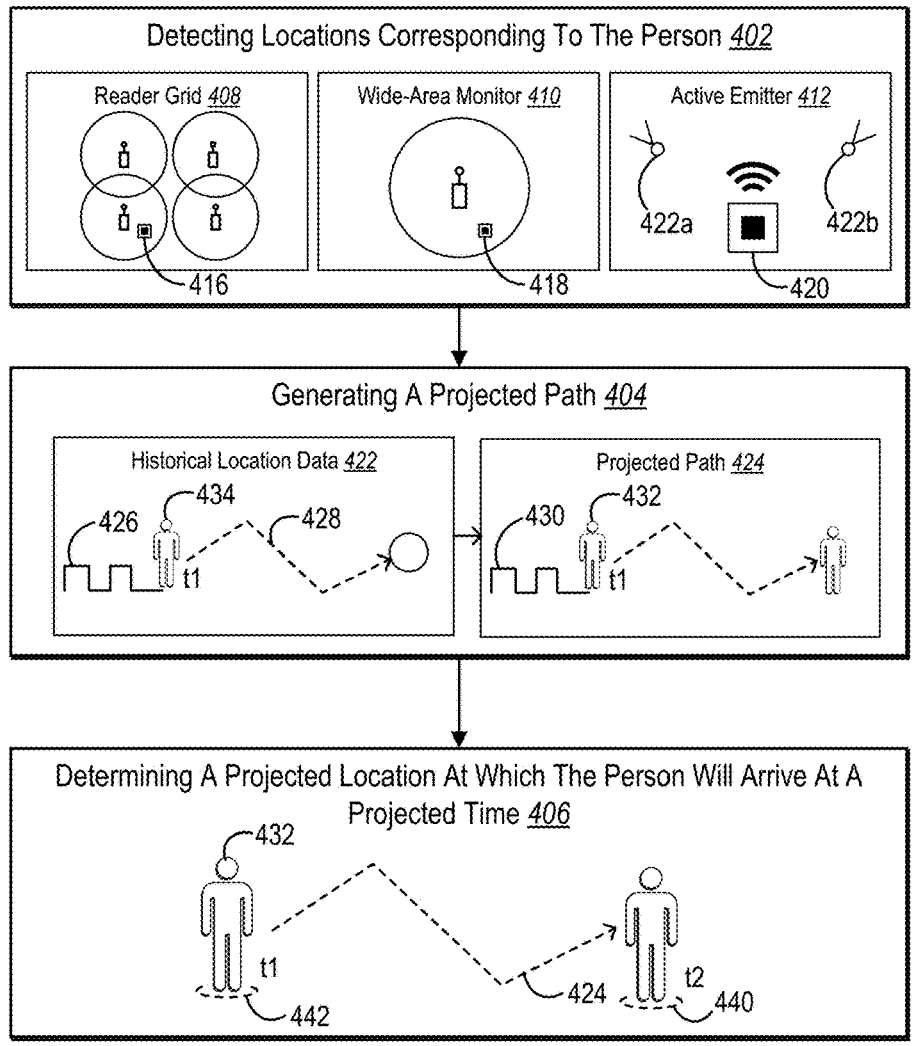
FIG. 4 illustrates an overview of the personalized-visual-content-display system determining a projected location at which a person will arrive at a projected time in accordance with one or more embodiments of the present disclosure.

To determine past locations of a person and a projected location, in one or more embodiments, the personalized-visual-content-display system 106 tracks the location of RFID tags of physical items in the set of physical items 212 as the person 214 travels through the physical space. Additionally, or alternatively, the personalized-visual-content-display system 106 utilizes methods differing from analyzing signals from the physical item to determine past locations of the person and the projected location. For example, in some embodiments, the personalized-visual-content-display system 106 utilizes device location data indicating the location of a computing device associated with the person, visual data from one or more cameras within the physical space, wireless (e.g., UWB) signals emitted by a container associated with the person, and other sensor data to determine the locations of the set of physical items. FIGS. 3-4 and the corresponding discussion provide additional detail with respect to predicting a projected location based on a projected path of the person 214 in accordance with one or more embodiments.

After determining the projected location, the personalized-visual-content-display system 106 performs the act 208 of identifying a digital-content-display device. Generally, the personalized-visual-content-display system 106 utilizes the projected location of the person to identify a digital-content-display device that the person 214 is likely to view in the future. In particular, the personalized-visual-content-display system 106 identifies a digital-content-display device 218 in proximity to the projected location 216 of the person 214 within the physical space. For example, the personalized-visual-content-display system 106 predicts that the person 214 will travel to a particular intersection within the physical space and identifies the digital-content-display device at or near the particular intersection.

As further illustrated in FIG. 2, the personalized-visual-content-display system 106 performs the act 210 of retrieving a visual content item. Generally, as part of the act 210, the personalized-visual-content-display system 106 determines a visual content item to display via the digital-content-display device 218 that matches the person 214 based on the set of physical items 212. In particular, the personalized-visual-content-display system 106 selects, from a collection of visual content items, a visual content item to display via the digital-content-display device 218. More specifically, the personalized-visual-content-display system 106 retrieves the visual content item to be viewed by the person 214 at the projected location and at the projected time. For example, as illustrated in FIG. 2, the personalized-visual-content-display system 106 provides, for display via the digital-content-display device 218, a visual content item including an advertisement for women's slacks. More specifically, the personalized-visual-content-display system 106 displays women's slacks that are size 4, which matches the sizes of the physical items B and C.

In one or more embodiments, the personalized-visual-content-display system 106 utilizes the set of item features extracted from a description(s) of the set of physical items 212 to select the visual content item from the collection of visual content items. In particular, the personalized-visual-content-display system 106 infers that the person 214 is likely interested in additional physical items that are similar to or otherwise related to the set of physical items 212. For example, in one or more embodiments, the personalized-visual-content-display system 106 extracts a set of item features from a description(s) the set of physical items 212 and a set of content features from the collection of visual content items. The personalized-visual-content-display system 106 maps the set of content features for the visual content items to the set of item features to identify a visual content item that is related or similar to the set of physical items 212. FIG. 6 and the corresponding discussion provide additional detail regarding how the personalized-visual-content-display system 106 retrieves the visual content item based on mapping a set of content features to a set of item features in accordance with one or more embodiments.

Figure 7:
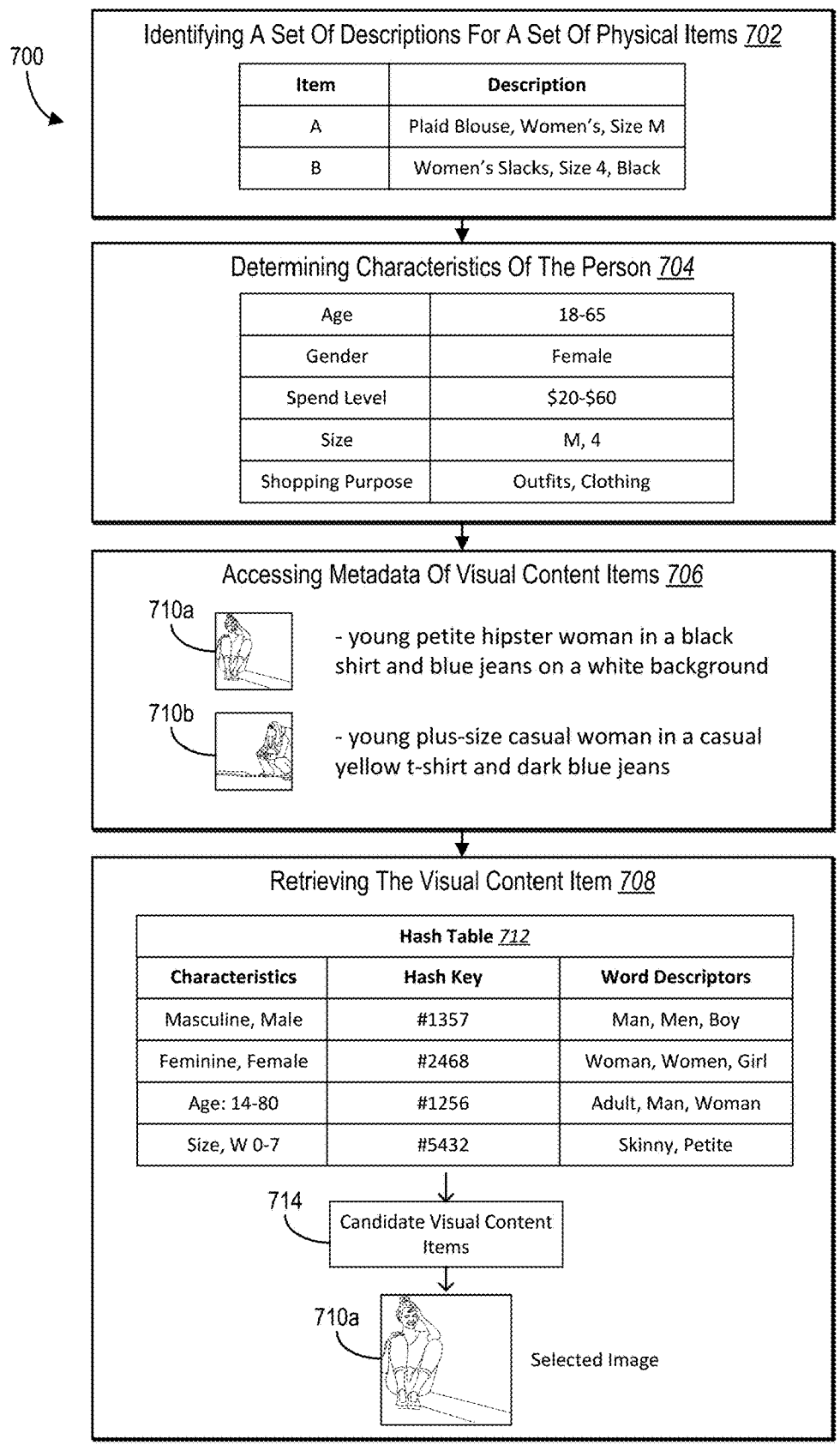
FIG. 7 illustrates an overview of the personalized-visual-content-display system retrieving a visual content item based on characteristics of the person in accordance with one or more embodiments of the present disclosure.
Figure 8:
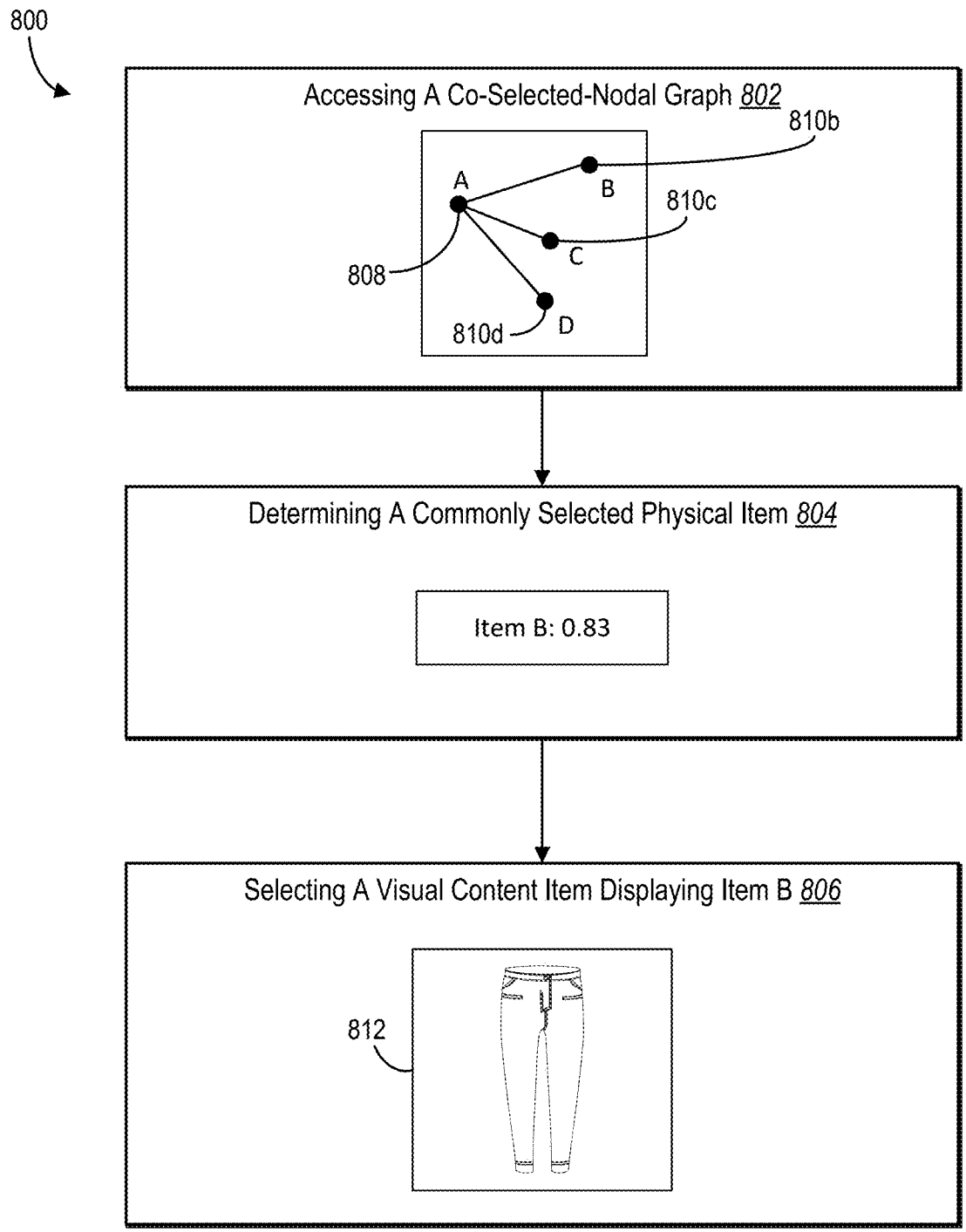
FIG. 8 illustrates an overview of the personalized-visual-content-display system retrieving a visual content item using a co-selected-nodal graph in accordance with one or more embodiments of the present disclosure.

Additionally, or alternatively, and as mentioned above with respect to the act 204, in some embodiments, the personalized-visual-content-display system 106 retrieves the visual content item based on analyses other than mapping a set of content features to a set of item features. For example, in one or more embodiments, the personalized-visual-content-display system 106 determines characteristics of the person 214 based on the set of physical items 212. As mentioned previously with respect to the act 204, in some embodiments, the personalized-visual-content-display system 106 utilizes the descriptions of the physical items to determine characteristics of the person. FIG. 7 and the corresponding discussion provide additional detail with respect to the personalized-visual-content-display system 106 determining characteristics of the person in accordance with one or more embodiments. In further embodiments, the personalized-visual-content-display system 106 determines the visual content item based on identifying commonly selected physical items based on a co-selected-nodal graph. FIG. 8 and the corresponding discussion provide additional detail regarding the personalized-visual-content-display system 106 accessing a co-selected-nodal graph in accordance with one or more embodiments.

As suggested above, the personalized-visual-content-display system 106 performs at least two tasks to deliver personalized visual content items to a person within a physical space: (i) the personalized-visual-content-display system 106 selects a visual content item that is tailored to the person based on the set of physical items, and (ii) the personalized-visual-content-display system 106 identifies a digital-content-display device by which to display the visual content item based on a projected location of the person. FIG. 3 illustrates an example physical space 300 within which the personalized-visual-content-display system 106 performs the above-mentioned tasks. As illustrated in FIG. 3, the physical space 300 comprises a store that contains physical items (e.g., physical items A, B, C, D, E, and F), a person 314, and a digital-content-display device 312.

As illustrated in FIG. 3, the personalized-visual-content-display system 106 identifies a set of physical items 308 selected by the person 314 within the physical space 300. In particular, the personalized-visual-content-display system 106 utilizes data received by various sensors within the physical space 300 to identify the set of physical items 308 selected one by one (or in groups) by the person 314.

FIG. 3 illustrates the identified set of physical items 308 at different times. For instance, at the time t1, the personalized-visual-content-display system 106 determines that the set of physical items 308a comprises a physical item A. At the time t2, the personalized-visual-content-display system 106 determines that the set of physical items 308b includes the physical items A, B, and C. At the time t3, the set of physical items 308c includes the physical items A, B, C, D, E, and F.

In one or more embodiments, the personalized-visual-content-display system 106 determines the set of physical items 308 based on determined locations of individual physical items. In particular, the personalized-visual-content-display system 106 accesses sensor data to determine locations of individual physical items. In one embodiment, the personalized-visual-content-display system 106 determines that a physical item has been selected by the person 314—and thus belongs to the set of physical items 308—based on the location of the physical item being within a threshold distance of the set of physical items 308.

Figure 5A:
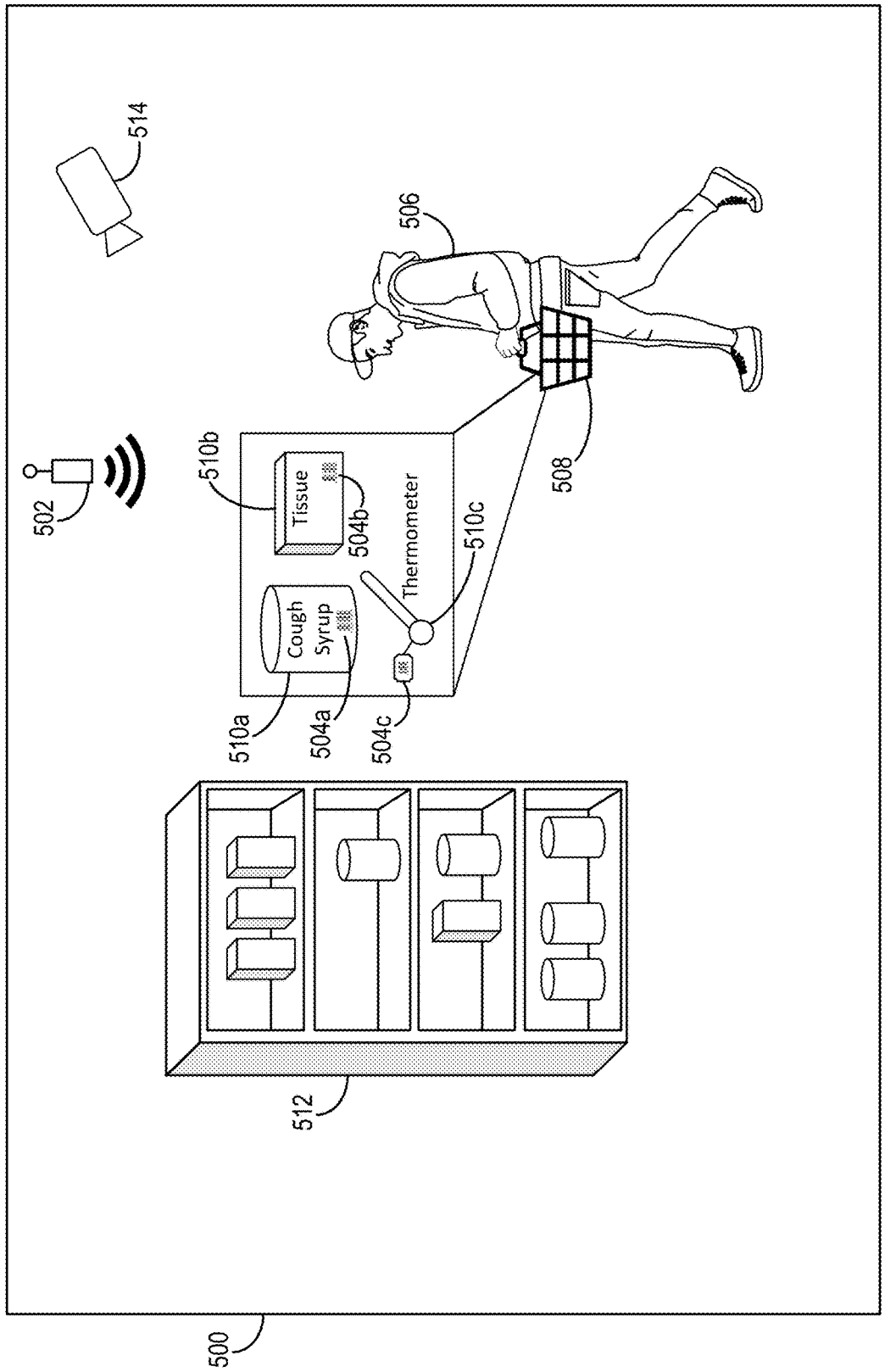
FIG. 5A illustrates example sensors utilized by the personalized-visual-content-display system to determine a set of physical items selected by a person in accordance with one or more embodiments of the present disclosure.
Figure 5B:
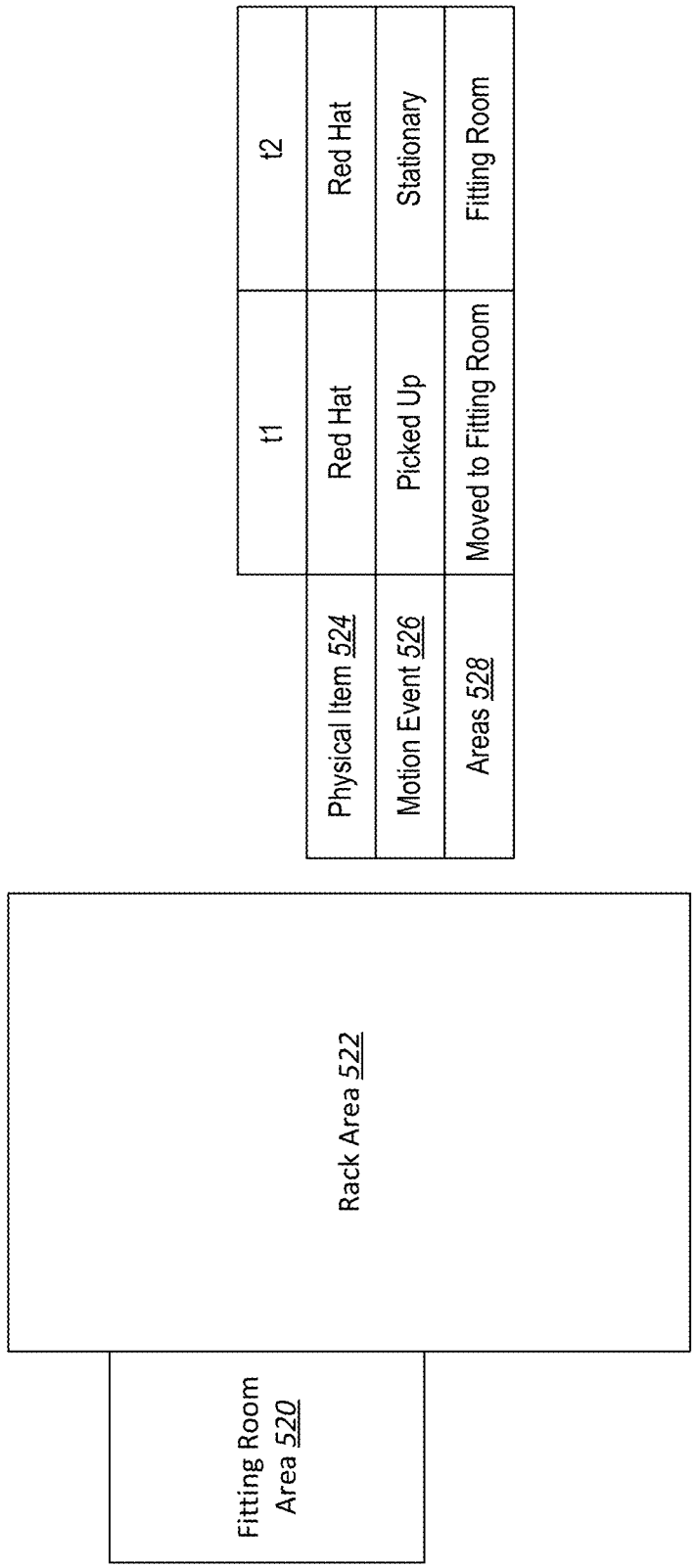
FIG. 5B illustrates the personalized-visual-content-display system determining motion events and movement of physical items between areas in accordance with one or more embodiments of the present disclosure.

Additionally, or alternatively, the personalized-visual-content-display system 106 determines that a physical item has been selected by the person 314—and thus add the physical item to the set of physical items 308—based on determining that the physical item is moving together with one or more physical items within the set of physical items. For instance, the personalized-visual-content-display system 106 determines that the movement of a physical item is similar to the movement of physical items within the set of physical items 308. FIGS. 5A-5B and the corresponding discussion provide additional detail regarding sensors that the personalized-visual-content-display system 106 utilizes to determine physical items within the set of physical items 308.

Although FIG. 3 illustrates the addition of physical items to the set of physical items 308, the personalized-visual-content-display system 106 also dynamically responds to removing physical items from the set of physical items. In particular, the personalized-visual-content-display system 106 dynamically adjusts its analysis for selecting the visual content item in real time based on physical items within the set of physical items 308. In one example, the personalized-visual-content-display system 106 determines that the physical item B is stationary at the location 302c while the physical items A and C continue moving toward the location 302d.

Based on identifying a divergence between locations of physical items within a set of physical items, the personalized-visual-content-display system 106 modifies the physical items within the set of physical items. For example, in one or more embodiments, the personalized-visual-content-display system 106 automatically determines that physical items that have continued in motion still belong to the set of physical items while physical items that have stopped movement are removed from the set of physical items. Additionally, or alternatively, in some embodiments, the personalized-visual-content-display system 106 determines to recognize a second set of physical items based on a divergence in location of physical items within a set of physical items.

As mentioned, the personalized-visual-content-display system 106 determines the set of physical items 308 in real time. More specifically, the personalized-visual-content-display system 106 continuously monitors physical items within the set of physical items 308. For example, in at least one embodiment, the personalized-visual-content-display system 106 continuously tracks the locations of physical items within the set of physical items 308. Additionally, or alternatively, the personalized-visual-content-display system 106 periodically monitors the set of physical items 308 at predetermined intervals (e.g., every 5 seconds, every minute). In any case, the personalized-visual-content-display system 106 continuously determines identifiers for the physical items within the set of physical items 308.

As further illustrated in FIG. 3, the personalized-visual-content-display system 106 maintains a set database 316 that indicates the physical items within identified sets of physical items. In some embodiments, the personalized-visual-content-display system 106 maintains and stores different sets of physical items associated with different people. For example, as illustrated in FIG. 3, the set database 316 includes a set #2468 associated with a first person and a set #1357 associated with a second person. Furthermore, the personalized-visual-content-display system 106 updates the set database 316 in real time to reflect physical items that are currently part of identified sets of physical items for a particular person. For instance, the personalized-visual-content-display system 106 adds and/or removes physical items associated with an entry of a particular set of physical items. In one example, the personalized-visual-content-display system 106 updates the set database 316 to include sets of physical items that are currently in motion within the physical space 300.

Based on determining that a set of physical items has left the physical space 300, for instance, the personalized-visual-content-display system 106 stops updating the entry corresponding to that set of physical items. Furthermore, in some embodiments, based on determining that a set of physical items has stopped movement for a threshold period of time, the personalized-visual-content-display system 106 stops updating or removes the entry corresponding to the idle set of physical items. In some embodiments, the personalized-visual-content-display system 106 accesses the set database 316 to select a visual content item 310.

As just suggested, the personalized-visual-content-display system 106 selects the visual content item 310 from a collection of visual content items based on the set of physical items 308. As illustrated in FIG. 3, the personalized-visual-content-display system 106 analyzes the content of the set of physical items 308 to select the visual content item 310 that is specific to the person 314. For instance, in one or more embodiments, the personalized-visual-content-display system 106 accesses the set database 316 to identify physical items within a particular set of physical items. The personalized-visual-content-display system 106 accordingly selects the visual content item 310 based on the one or more physical items within the set of physical items.

In addition to selecting the visual content item 310, the personalized-visual-content-display system 106 also identifies a digital-content-display device 312 by which to display the visual content item 310. As illustrated in FIG. 3, and as mentioned, the personalized-visual-content-display system 106 determines locations of the person 314 and/or the set of physical items 308. Based on the determined locations, the personalized-visual-content-display system 106 generates a projected path 306 and determines a projected location 304 of the person 314 that is in proximity to the digital-content-display device 312. The following paragraphs provide an overview of the personalized-visual-content-display system 106 determining locations associated with the set of physical items 308 for the purposes of identifying the digital-content-display device 312.

As mentioned, in some embodiments, the personalized-visual-content-display system 106 detects locations of physical items within a set of physical items. In particular, in one or more embodiments, the personalized-visual-content-display system 106 generates a projected path of the person based on detected locations at which the person interacted with or otherwise selected a physical item from the set of physical items 308. For example, as illustrated in FIG. 3, the personalized-visual-content-display system 106 detects locations at which the person 314 selects the physical items. The personalized-visual-content-display system 106 determines that the person 314 selects the physical item A at the location 302b, the physical items B and C at the location 302c, and the items D, E, and F at the location 302d. In some embodiments, the personalized-visual-content-display system 106 also tracks the location of one or more physical items of the set of physical items 308 between the locations 302b-302d.

As part of generating the projected path, in certain implementations, the personalized-visual-content-display system 106 tracks the location of the person 314. By contrast, in some embodiments, the personalized-visual-content-display system 106 does not track the location of the person 314 if the person has not yet selected any physical items. More specifically, in one or more embodiments, the personalized-visual-content-display system 106 tracks the locations of physical items within a set of physical items and not the person 314. For instance, in at least one embodiment, the personalized-visual-content-display system 106 does not track the location of the person 314 between the times t0 and t1 because the person 314 has not yet selected any physical items. Additionally, or alternatively, the personalized-visual-content-display system 106 tracks the location of the person 314, even if the person has not selected any physical items. In one example, the personalized-visual-content-display system 106 tracks the location of a container associated with the person 314. In yet another example, the personalized-visual-content-display system 106 analyzes visual data or other sensor data to determine the location of the person 314, even if the person has not yet selected a physical item.

As further illustrated in FIG. 3, the personalized-visual-content-display system 106 generates the projected path 306. Generally, the projected path 306 comprises a route that the person 314 is likely to travel in the future. In some embodiments, the personalized-visual-content-display system 106 analyzes historical location data in combination with the locations 302a-302d to determine the projected path 306. FIG. 4 and the corresponding discussion provide additional detail with respect to generating a projected path based on historical location data in accordance with one or more embodiments.

In some embodiments, and as further illustrated in FIG. 3, the personalized-visual-content-display system 106 generates the predicted path 306 based on the set of physical items 308. Generally, the personalized-visual-content-display system 106 predicts that a person who has selected the set of physical items 308 is more likely to take a particular projected path. In particular, in some embodiments, the personalized-visual-content-display system 106 predicts one or more additional physical items that the person 314 is likely to select based on the set of physical items 308. For example, based on determining that the set of physical items 308 includes baby clothing, the personalized-visual-contentdisplay system 106 might predict a higher likelihood that the person 314 will next go toward a baby-food section within the physical space 300.

As illustrated in FIG. 3, the personalized-visual-content-display system 106 determines the projected location 304 of the person 314 within the physical space 300 based on the projected path 306. Generally, the projected location 304 comprises a point along the projected path 306 at a projected time. In one or more embodiments, the personalized-visual-content-display system 106 determines the projected location 304 by selecting a point along the projected path 306 that is in proximity to a digital-content-display device. For example, in at least one embodiment, the personalized-visual-content-display system 106 identifies, as the projected location 304, the closest point to the current location of the person 314 that is also in proximity to the digital-content-display device 312.

As further illustrated in FIG. 3, the personalized-visual-content-display system 106 also determines a projected time at which the personalized-visual-content-display system 106 predicts the person 314 will arrive at the projected location 304. In some embodiments, the personalized-visual-content-display system 106 utilizes a time period of a threshold duration to determine a projected time. For example, the personalized-visual-content-display system 106 utilizes a predetermined travel speed for the person 314. The personalized-visual-content-display system 106 assumes that the person 314 will travel along the projected path at the predetermined travel speed and accordingly determines the projected time at which the person will arrive at the projected location 304. In other embodiments, the personalized-visual-content-display system 106 determines a travel speed for the person 314 based on the locations 302a-302d as well as the times t0-t3. In one example, the personalized-visual-content-display system 106 determines travel times between the locations 302a-302d and determines the projected time based on the determined travel times.

In sum, FIG. 3 illustrates an example environment in which the personalized-visual-content-display system 106 selects a visual content item to display and a digital-content-display device by which to display the selected visual content item in accordance with one or more embodiments. FIG. 4 and the corresponding discussion provide additional detail regarding how the personalized-visual-content-display system 106 determines a projected location of a person for selecting a digital-content-display device in accordance with one or more embodiments. In particular, FIG. 4 illustrates a series of acts 400 including an act 402 of detecting locations corresponding to the person, an act 404 of generating a projected path, and an act 406 of determining a projected location at which the person will arrive at a projected time.

As illustrated in FIG. 4, the series of acts 400 includes the act 402 of detecting locations corresponding to the person. Generally, the personalized-visual-content-display system 106 utilizes various methods for detecting locations corresponding to the person. In some embodiments, the personalized-visual-content-display system 106 detects locations corresponding to the person by tracking locations of individual physical items or the set of physical items selected by the person. In further embodiments, the personalized-visual-content-display system 106 directly tracks the location of the person. FIG. 4 illustrates various methods by which the personalized-visual-content-display system 106 tracks locations corresponding to the set of physical items. For example, the personalized-visual-content-display system 106 may utilize a reader grid 408, a wide-area monitor 410, or an active emitter 412 to detect locations of the person. The following paragraphs provide additional detail regarding each of these implementations.

As illustrated in FIG. 4, in some embodiments, the personalized-visual-content-display system 106 utilizes the reader grid 408 to detect locations corresponding to the person. In particular, the personalized-visual-content-display system 106 utilizes a grid of readers within the physical space to track the physical locations of physical items within the set of physical items. For example, as illustrated, the personalized-visual-content-display system 106 employs a grid comprising four readers.

In at least one embodiment, the readers comprise RFID sensors. An RFID sensor transmits signals to an RFID tag 416 affixed to a physical item. The RFID tag 416 broadcasts identification information of the physical item and other data to the RFID sensor. The personalized-visual-content-display system 106 tracks the location of the RFID tag 416 as it moves between signal boundaries of different RFID sensors. By implementing the reader grid 408, the personalized-visual-content-display system 106 generates a rough path of the RFID tag 416 as the RFID tag travels between signal boundaries of the RFID sensors. As suggested by FIG. 4, the personalized-visual-content-display system 106 similarly detects signals from and tracks the location of other RFID tags attached to physical items selected by the person.

In some embodiments, and as further illustrated in FIG. 4, the personalized-visual-content-display system 106 deploys the wide-area monitor 410. In some cases, the wide-area monitor 410 comprises a reader of higher sensitivity than the readers utilized as part of the reader grid 408. More specifically, in some embodiments, the wide-area monitor 410 comprises a highly sensitive fixed reader that includes an array of antennas. In contrast to the reader grid 408 that the personalized-visual-content-display system 106 utilizes to determine a rough path of a tag depending on the RFID sensor that captures signals from the RFID tag, the personalized-visual-content-display system 106 determines 2-dimensional coordinates (e.g., x, y coordinates) of a tag 418 by utilizing the wide-area monitor 410. In one example, the wide-area monitor 410 comprises fixed gateway readers, such as, the xArray made by Impinj® described in Mike Lenehan, "xArray Gateway Product Brief/Datasheet," support.impinj.com/hc/en-us/articles/202755688-xArray-Gateway-Product-Brief-Datasheet (Jun. 5, 2020).

Additionally, or alternatively, the personalized-visual-content-display system 106 tracks locations corresponding to the set of physical items by utilizing the active emitter 412. Generally, an active emitter 412 comprises an active signal emitter. For example, in some embodiments, the active emitter 412 comprises a UWB transmitter 420 associated with the set of physical items. In one example, the UWB transmitter 420 is affixed to a container, such as a shopping cart or basket utilized by the person. The UWB transmitter 420 emits signals received by beacons 422a-422b. Based on the signals received by the beacons 422a-422b, the personalized-visual-content-display system 106 determines locations associated with the set of physical items. For example, in one or more embodiments, the UWB transmitter 420 and the beacons 422a-422b comprise transmitters and beacons described in Zoltan Koppanyi, et al., "Performance Analysis of UWB Technology for Indoor Positioning," *Proceedings of the* 2014 *International Technical meeting of The Institute of Navigation*, San Diego, Calif., January 2014, pp. 154-165, the entire contents of which are hereby incorporated by reference.

As further illustrated in FIG. 4, the personalized-visual-content-display system 106 performs the act 404 of generating a projected path. Generally, the personalized-visual-content-display system 106 generates a projected path 424 based on detected locations at which the person interacted with or otherwise selected a physical item from the set of physical items. In particular, the personalized-visual-content-display system 106 generates the projected path based on locations corresponding to the electromagnetic signals from the tags associated with the set of physical items. As mentioned previously, in some embodiments, the personalized-visual-content-display system 106 generates the projected path based on previous locations of one or more physical items of the set of physical items as indicated by the electromagnetic signals. Additionally, or alternatively, the personalized-visual-content-display system 106 generates the path based on predicting one or more additional physical items that the person is likely to select based on the set of physical items.

As illustrated in FIG. 4, in some embodiments, the personalized-visual-content-display system 106 generates the projected path based on previous locations by accessing historical location data 422. In particular, historical location data comprises historical locations associated with historical persons within the physical space. For example, the personalized-visual-content-display system 106 stores historical location data that includes historical paths taken by historical persons. Generally, the personalized-visual-content-display system 106 generates the projected path for a person 432 based on trajectories of similar historical persons 434.

In one or more embodiments, the personalized-visual-content-display system 106 predicts that the person 432 will travel a projected path 424 that is the same as or similar to historical paths 428 traveled by historical persons. To illustrate, in some embodiments, the personalized-visual-content-display system 106 determines locations 430 corresponding to the set of physical items. In particular, the locations 430 together indicate where the person 432 has traveled within the physical location over a period of time. The personalized-visual-content-display system 106 identifies, from the historical location data 422, historical locations 426 associated with the historical persons 434 within the physical space. As illustrated in FIG. 4, the personalized-visual-content-display system 106 identifies the historical locations 426 that are the same as the locations 430. The personalized-visual-content-display system 106 determines historical paths 428 corresponding to the historical locations. In some embodiments, the personalized-visual-content-display system 106 determines the projected path 424 based on the most frequently taken historical paths 428.

In some embodiments, the personalized-visual-content-display system 106 relies on analyses beside the historical paths 428 to determine the projected path 424. In one example, the personalized-visual-content-display system 106 predicts that the person will travel the projected path 424 utilizing deep learning algorithms. For example, in one or more embodiments, the personalized-visual-content-display system 106 employs trajectory-determination techniques, such as trajectory data preprocessing, trajectory clustering, trajectory pattern mining, trajectory segmentation, and/or trajectory representation. The above listed techniques are described in Ruizhi Wu, et al., "Location Prediction on Trajectory Data: A Review," Big Data Mining and Analytics, vol. 1, no. 2, pp. 108-127, June 2018, the entire contents of which are hereby incorporated by reference.

In some embodiments, the personalized-visual-content-display system 106 dynamically updates the projected path 424 as the person 432 and/or the set of physical items move through the physical space. In particular, based on determining that the person is at a new location that diverges from an initial projected path, the personalized-visual-content-display system 106 generates an updated projected path based on the new location. More specifically, the personalized-visual-content-display system 106 updates the projected path by analyzing historical location data comprising a historical location that corresponds to the new location.

As further illustrated in FIG. 4, the personalized-visual-content-display system 106 performs the act 406 of determining a projected location at which the person will arrive at a projected time. As mentioned previously, the personalized-visual-content-display system 106 identifies a projected location 440 along the projected path 424. In some embodiments, the projected location 440 comprises a location where the projected path 424 meets or is within a threshold distance of a digital-content-display device.

Additionally, and as illustrated in FIG. 4, the personalized-visual-content-display system 106 determines a projected time (t2) at which the person 432 will arrive at the projected location 440. As mentioned previously, in some embodiments, the personalized-visual-content-display system 106 determines the projected time (t2) by adding a threshold duration to a current time (t1). Additionally, or alternatively, the personalized-visual-content-display system 106 determines travel times based on locations corresponding to the set of physical items and travel times between the locations. For example, in one or more embodiments, the personalized-visual-content-display system 106 determines an average travel speed for the person 432 based on the locations and the recorded travel times. Alternatively, the personalized-visual-content-display system 106 identifies an average travel speed for people generally. The personalized-visual-content-display system 106 then determines the projected time (t2) based on the distance between the projected location 440 and a current location 442 of the person 432 and the average travel speed for the person 432.

FIG. 4 and the corresponding discussion describe how the personalized-visual-content-display system 106 identifies a digital-content-display device based on generating a projected path for the person and/or the set of physical items. FIGS. 5A-8 and the corresponding paragraphs provide additional detail regarding how the personalized-visual-content-display system 106 selects a visual content item to display via the identified digital-content-display device. In particular, FIGS. 5A-5B illustrate various methods by which the personalized-visual-content-display system 106 identifies the set of physical items. FIGS. 6-8 illustrate various methods by which the personalized-visual-content-display system 106 selects a visual content item based on the set of physical items.

FIG. 5A illustrates an example physical space 500 comprising various sensors for identifying the set of physical items. In particular, the physical space 500 includes an electromagnetic sensor 502, electromagnetic tags 504a-504c affixed to physical items 510a-510c, and an item-holding structure 512.

In some embodiments, the personalized-visual-content-display system 106 determines the physical items 510a-510c within the set of physical items based on electromagnetic signals emitted by the electromagnetic tags 504a-504c affixed to the physical items 510a-510c. In particular, and as illustrated in FIG. 5A, the electromagnetic sensor 502 receives the electromagnetic signals emitted by the electromagnetic tags 504a-504c. The electromagnetic signals include identifiers for (or otherwise indicate the identities of)

the corresponding physical items 510a-510c. In one or more embodiments, the electromagnetic tags 504a-504c comprise RFID tags.

FIG. 5A illustrates the electromagnetic sensor 502 located on the ceiling of the physical space 500. As mentioned previously, in some embodiments, the physical space 500 includes an array of electromagnetic sensors. The electromagnetic sensor 502 may be located in any location suitable for capturing signals emitted by the electromagnetic tags 504a-504c. In some embodiments, the container 508 is associated with a container electromagnetic sensor. In such embodiments, the container electromagnetic sensor receives electromagnetic signals from the electromagnetic tags 504a-504c located within the container 508. The container electromagnetic sensor further emits signals to the electromagnetic sensor 502 including identifiers for (or to otherwise indicate the identities of) the physical items 510a-510c located within the container 508.

As further illustrated in FIG. 5A, the physical space 500 includes the item-holding structure 512. In some embodiments, the item-holding structure 512 is associated with one or more sensors that indicate the presence of physical items located within or on the item-holding structure 512. For example, in one or more embodiments, the item-holding structure 512 includes an electromagnetic sensor that determines the presence of physical items within the item-holding structure 512 based on signals from affixed electromagnetic tags. In further embodiments, the item-holding structure 512 includes other types of sensors, such as pressure sensors and/or cameras that detect the presence of physical items within the item-holding structure 512. Sensors associated with the item-holding structure 512 communicate with the personalized-visual-content-display system 106 to indicate whether a physical item has been removed from the item-holding structure 512. As illustrated in FIG. 5A, for example, the item-holding structure 512 comprises a shelving unit with smart shelving features and sensors. But the personalized-visual-content-display system 106 can use any suitable item-holding structure, including containers, hangers, racks, etc.

The physical space 500 illustrated in FIG. 5A also includes a camera 514. The camera 514 captures visual data relating to a set of physical items. Generally, the camera 514 captures visual data that tracks locations and movement of physical items within the physical space 500. In some embodiments, the personalized-visual-content-display system 106 analyzes image and/or video data captured by the camera 514. More specifically, the personalized-visual-content-display system 106 utilizes computer vision to identify physical items within the image and/or video data.

In some embodiments, the personalized-visual-content-display system 106 utilizes computer vision to determine the location of the person 506. In one example, the personalized-visual-content-display system 106 utilizes visual data from the camera 514 in conjunction with other sensors within the physical space 500 to identify a set of physical items. For instance, in one or more embodiments, the personalized-visual-content-display system 106 determines, based on visual data captured by the camera 514, that the person 506 is located within a threshold proximity of the item-holding structure 512. Based on receiving signals from the item-holding structure 512 that particular physical items have left the item-holding structure 512, the personalized-visual-content-display system 106 determines that the person 506 selected the particular physical items.

As described previously, in certain implementations, the personalized-visual-content-display system 106 determines the set of physical items by identifying co-located physical items that move together through the physical space. For instance, in some embodiments, the personalized-visual-content-display system 106 identifies a set of physical items by determining that one or more physical items are co-located or located within a threshold distance of each other. In one such case, the personalized-visual-content-display system 106 determines that physical items located within a threshold distance of two feet (or some other threshold distance) of each other are co-located and thus belong to a single set of physical items. In further embodiments, the personalized-visual-content-display system 106 determines the set of physical items by identifying items of interest. Generally, items of interest comprise physical items with which a person has interacted but has not necessarily added to the set of physical items. In one example, an item of interest comprises an item that the person picks up but leaves. FIG. 5B and the corresponding discussion detail how the personalized-visual-content-display system 106 identifies an item of interest in accordance with one or more embodiments.

As further suggested above, in one or more embodiments, the personalized-visual-content-display system 106 determines the set of physical items based on one or more physical items that are within a group at a given time. In particular, the personalized-visual-content-display system 106 adds a physical item to the set of physical items based on determining that the person has selected and traveled with the physical item for at least a threshold distance or a threshold amount of time. In one example, based on determining that the location of a particular physical item diverges from locations corresponding to remaining physical items within the set of physical items, the personalized-visual-content-display system 106 removes the particular physical item from the set of physical items.

By contrast, in further embodiments, the personalized-visual-content-display system 106 adds all physical items with which the person has interacted to the set of physical items, regardless of whether the physical items are added to the group of physical items. In one example, the personalized-visual-content-display system 106 adds a physical item to the set of physical items, even if the person simply picked up, viewed, and set down the physical item. As illustrated in FIG. 5B, for instance, the personalized-visual-content-display system 106 determines a physical item of a set of physical items by determining one or more motion events 526 corresponding to a physical item 524. Additionally, or alternatively, the personalized-visual-content-display system 106 determines that a physical item belongs within a set of physical items based on areas 528 to which the physical item 524 has traveled.

In some embodiments, the personalized-visual-content-display system 106 determines motion events 526 corresponding to the physical item 524. Generally, the motion events 526 comprise occurrences marked my movement of a physical item. In particular, a motion event comprises an instance in which a person interacts with a physical item. Examples of motion events comprise a person touching, picking up, moving, or setting down a physical item. For instance, as illustrated in FIG. 5B, the personalized-visual-content-display system 106 identifies the motion events 526 associated with the physical item 524 at different times (t1 and t2). The personalized-visual-content-display system 106 determines that, at t1, the physical item 524 was picked up, and at t2, the physical item 524 was stationary.

In one or more embodiments, the personalized-visual-content-display system 106 analyzes electromagnetic signals emitted by tags affixed to physical items to determine the motion events 526. In one example, the personalized-visual-content-display system 106 determines the motion events 526 based on RFID signals. For instance, the personalized-visual-content-display system 106 receives, from an RFID reader, signal measurements reflected by an RFID tag affixed to the physical item 524. More specifically, the signal measurements comprise signal power, phase angle, and frequency shift. The personalized-visual-content-display system 106 determines the motion events 526 based on the signal measurements. The personalized-visual-content-display system 106 further identifies the physical item 524 as an item of interest based on the one or more motion events. For example, in one or more embodiments, the personalized-visual-content-display system 106 identifies items of interest based on the motion events 526 as described in Hanchuan Li, et al., "IDSense: A Human Object Interaction Detection System Based on Passive UHF RFID," CHI '15: Proceedings of the 33$^{rd}$ Annual ACM Conference on Human Factors in Computing Systems, pp. 2555-256, https://doi.org/10.1145/2702123.2702178, (April 2015), the entire contents of which are hereby incorporated by reference.

Furthermore, and as illustrated in FIG. 5B, in some embodiments, the personalized-visual-content-display system 106 determines physical items within the set of physical items based on areas 528 within the physical space to which the physical items have been moved. Generally, the personalized-visual-content-display system 106 determines that a physical item belongs to a set of physical items based on the movement of the physical item into a particular area within the physical space. For example, the personalized-visual-content-display system 106 determines that the physical item 524 is an item of interest based on determining that the person moved the physical item 524 from a rack area 522 to a fitting room area 520. In this example, the personalized-visual-content-display system 106 determines that physical items that have been moved into the fitting room area 520 are associated with a higher likelihood of being items of interest to the person.

Accordingly, in some embodiments, the personalized-visual-content-display system 106 determines that a physical item is not a part of a set of physical items based on the person excluding the physical item from the person's movement into a particular area. For example, and as illustrated in FIG. 5B, the personalized-visual-content-display system 106 determines that a physical item is not part of a set of physical items if the physical item is left in the rack area 522 and is not brought along with other physical items into the fitting room area 520. To illustrate, the personalized-visual-content-display system 106 determines that the person moved a first physical item to an area (e.g., the fitting room area 520) within the physical space while also determining that the person did not move a second physical item into the area. Based on these determinations, the personalized-visual-content-display system 106 further determines that the first physical item is part of the set of physical items while the second physical item is not part of the set of physical items.

As discussed, the personalized-visual-content-display system 106 selects a visual content item to display via a digital-content-display device based on a set of physical items. FIGS. 5A-5B illustrate various methods by which the personalized-visual-content-display system 106 identifies physical items within the set of physical items in accordance with one or more embodiments. FIGS. 6-8 provide example methods by which the personalized-visual-content-display system 106 selects visual content items based on the set of physical items in accordance with one or more embodiments. By way of overview, FIG. 6 illustrates the personalized-visual-content-display system 106 selecting visual content items based on item embeddings and content embeddings in accordance with one or more embodiments. FIG. 7 illustrates the personalized-visual-content-display system 106 retrieving a visual content item based on characteristics of the person in accordance with one or more embodiments. FIG. 8 illustrates the personalized-visual-content-display system 106 accessing and analyzing a co-selected-nodal graph in accordance with one or more embodiments.

FIG. 6 illustrates a series of acts 600 for determining a measure of similarity between a set of physical items and visual content items based on item and content embeddings. In some embodiments, the personalized-visual-content-display system 106 selects a visual content item from a collection of visual content items by performing a word-embedding match or word-embedding comparison between the descriptions of physical items and descriptions of images. The series of acts 600 includes an act 602 of identifying a set of descriptions for a set of physical items, an act 604 of generating item embeddings, an act 606 of generating content embeddings, and an act 608 of determining a measure of similarity.

As illustrated in FIG. 6, the personalized-visual-content-display system 106 performs the act 602 of identifying a set of descriptions for a set of physical items. As part of determining the set of physical items, the personalized-visual-content-display system 106 accesses identifiers of physical items in the set of physical items. The personalized-visual-content-display system 106 utilizes the identifiers of the physical items to access descriptions of the physical items within the set of physical items. For example, in at least one embodiment, the personalized-visual-content-display system 106 utilizes a physical item identifier to look up a description for the physical item within a physical item database. As illustrated in FIG. 6, the personalized-visual-content-display system 106 determines that the description for the physical item associated with the identifier "A" is "Plaid blouse, women's, size M." In some embodiments, the personalized-visual-content-display system 106 aggregates or concatenates the description for each physical item in a set of physical items into a single description.

As further illustrated in FIG. 6, the personalized-visual-content-display system 106 performs the act 604 of generating item embeddings. Generally, the personalized-visual-content-display system 106 extracts, utilizing a language-embedding model 610, a set of item features from the set of descriptions. In some embodiments, the personalized-visual-content-display system 106 generates individual item features 612*a*-612*b*, each corresponding to a physical item within the set of physical items. For example, as illustrated in FIG. 6, the individual item features 612*a*-612*b* comprise individual feature vectors corresponding to the physical items A and B, respectively. In certain embodiments, the personalized-visual-content-display system 106 generates a combined item feature 614 corresponding to aggregated or concatenated descriptions of all physical items within the set of physical items. For example, as illustrated in FIG. 6, the personalized-visual-content-display system 106 aggregates or concatenates the descriptions corresponding to the physical items A and B. The personalized-visual-content-display system 106 utilizes the language-embedding model 610 to extract the combined item feature 614 from the descriptions of the combined physical items A and B.

Generally, the language-embedding model 610 illustrated in FIG. 6 comprises one or more language models that map words or phrases to features such as vectors. The language-embedding model 610 comprises any suitable model utilized to generate item features. For example, in one or more embodiments, the language-embedding model comprises a Word2Vec model. Generally, a Word2Vec model may be implemented as a neural network trained to reconstruct usage contexts of features as feature embeddings.

Alternatively, in some embodiments, the personalized-visual-content-display system 106 utilizes a bi-directional long-short-term-memory (Bi-LSTM) network or a gated-recurrent-unit (GRU) network as the language-embedding model 610 to extract word embeddings or language embeddings from descriptions, such as Global Vectors (GloVe) embeddings.

Additionally, in certain implementations, the personalized-visual-content-display system 106 further passes such word embeddings or language embeddings through repeated units of a fully connected (FC) layer with dropout, a rectified linear units (ReLU) activation layer, and a L2-norm (L2 Norm) layer before generating item embeddings, such that the item beddings share a common-embedding space or dimensionality as the content embeddings.

As further illustrated in FIG. 6, the personalized-visual-content-display system 106 performs the act 606 of generating content embeddings. In particular, the personalized-visual-content-display system 106 generates, utilizing an image-embedding model 616, content features 618a-618b for visual content items 620a-620b. As illustrated in FIG. 6, the content features 618a-618b comprise feature vectors (e.g., a series of numbers). In some embodiments, the image-embedding model 616 accesses (and extracts the content features 618a-618b from) metadata associated with the visual content items 620a-620b. The metadata comprises textual descriptions of the visual content items 620a-620b. Thus, in some embodiments, the image-embedding model 616 comprises one or more language models that map words or phrases to features, such as vectors. In one example, the image-embedding model 616 comprises a Word2Vec model.

By contrast, in certain embodiments, the personalized-visual-content-display system 106 extracts the content features 618a-618b from the visual content items 620a-620b using an alternative image embedding model. For example, the personalized-visual-content-display system 106 can use an ImageNet, a DenseNet, or other ResNet as the image embedding model 616 to extract the content features 618a-618b from the visual content items 620a-620b.

As further shown in FIG. 6, the series of acts 600 also includes the act 608 of determining a measure of similarity. In particular, in one or more embodiments, the personalized-visual-content-display system 106 maps the content features 618a-618b to the individual item features 612a-612b and/or the combined item feature 614 in a common embedding space. For example, as illustrated in FIG. 6, the personalized-visual-content-display system 106 maps content embeddings 626a-626b (corresponding to the content features 618a-618b, respectively) to the individual item embeddings 624a-624b (corresponding to the individual item features 612a-612b, respectively) within a common embedding space 622a. The personalized-visual-content-display system 106 further determines measures of similarity among the individual item embeddings 624a-624b and the content embeddings 626a-626b based on embedding distances or other methods.

Indeed, the personalized-visual-content-display system 106 can deploy various methods (or algorithms) to determine measures of similarity. In addition to embedding-space distances, for example, the personalized-visual-content-display system 106 utilizes cosine similarity calculations, k-nearest neighbor calculations, and/or clustering techniques to determine distances between the individual item embeddings 624a-624b and the content embeddings 626a-626b. In one or more embodiments, the personalized-visual-content-display system 106 selects a visual content item based on the content embedding of the content embeddings 626a-626b with the lowest average distance to the individual item embeddings 624a-624b.

As illustrated in FIG. 6, the personalized-visual-content-display system 106 selects the visual content item corresponding to the content embedding 626a based on determining that the content embedding 626a is located the shortest average distance from the individual item embeddings 624a-624b. In some implementations, the personalized-visual-content-display system 106 selects more than one visual content item by identifying multiple content embeddings within a threshold distance of the item embedding(s). Additionally, or alternatively, the personalized-visual-content-display system 106 selects more than one visual content item by identifying a threshold number of the closest content embeddings.

In the alternative to mapping individual item embeddings to one or more content embedding, in some embodiments, the personalized-visual-content-display system 106 maps the content embeddings 626a-626b to a combined item embedding 628 (corresponding to the combined item feature 614) within a common embedding space 622b. The personalized-visual-content-display system 106 can determine distances between the combined item embedding 628 and the content embeddings 626a-626b utilizing the methods (or algorithms) described above. For example, the personalized-visual-content-display system 106 performs cosine similarity calculations between the combined item embedding 628 and the content embeddings 626a-626b. The personalized-visual-content-display system 106 selects the visual content item based on identifying a content embedding located the shortest distance from the combined item embedding 628 within the common embedding space 622b.

In one or more embodiments, the personalized-visual-content-display system 106 selects a visual content item based on determining characteristics of the person. FIG. 7 illustrates the personalized-visual-content-display system 106 performing a series of acts 700 for retrieving a visual content item based on characteristics of the person. In particular, the series of acts 700 includes an act 702 of identifying a set of descriptions for a set of physical items, an act 704 of determining characteristics of the person, an act 706 of accessing metadata of visual content items, and an act 708 of retrieving the visual content item.

As illustrated in FIG. 7, the series of acts 700 includes the act 702 of identifying a set of descriptions for a set of physical items. As previously described, in certain implementations, the personalized-visual-content-display system 106 accesses descriptions corresponding to identifiers of each physical item within the set of physical items.

As further illustrated by FIG. 7, the series of acts 700 further includes the act 704 of determining characteristics of the person. Generally, the personalized-visual-content-display system 106 infers, based on the set of physical items, characteristics or attributes of a person based on the set of physical items selected by the person. In some embodiments, the personalized-visual-content-display system 106 infers at least one of an age, gender, spend level, size, or shopping purpose based on the set of physical items. In further embodiments, the personalized-visual-content-display system 106 infers additional attributes of the person, such as a body type and other characteristics. As illustrated in FIG. 7, for instance, the personalized-visual-content-display system 106 determines, based on the descriptions associated with the physical items A-B, the age, gender, spend level, size, and shopping purpose for the person.

To illustrate, in one or more embodiments, as part of performing the act 704 of determining characteristics of the person, the personalized-visual-content-display system 106 determines characteristics and corresponding confidence scores based on the description(s) of physical items. For instance, the personalized-visual-content-display system 106 determines characteristics of the person from the description(s) of the physical items—or from item features extracted from the description(s)—and generates confidence scores for such characteristics. In some instance, the personalized-visual-content-display system 106 applies a classification algorithm to the description(s) of the physical items. Alternatively, in some cases, the personalized-visual-content-display system 106 initially utilizes a language embedding model to extract individual item features and/or the combined item features from the set of descriptions. The personalized-visual-content-display system 106 further analyzes the individual item features and/or the combined item features to determine the characteristics of the person (e.g., age, gender, spend level, size, shopping purpose) and corresponding confidence scores.

In one or more embodiments, the personalized-visual-content-display system 106 utilizes classification algorithms to determine such characteristics of the person based on either the description(s) of the physical items or the item features extracted from the description(s) by the language embedding model. For instance, the personalized-visual-content-display system 106 can pass the description(s) or the item features through a Support Vector Machine (SVM), a Long Short Term Memory (LSTM) network (e.g., Bi-LSTM), a Convolutional Neural Network (CNN), or other classification algorithm trained on natural language, bag of words, or textual embeddings (e.g., word embeddings) to classify the description(s) or the item features extracted from the description(s) and determine characteristics of the person along with corresponding confidence scores.

As indicated above, the confidence scores indicate the likelihood that the characteristic is accurately associated with the person. In one example, the personalized-visual-content-display system 106 determines (i) a "female" characteristic based on the description(s) or the extracted item features and (ii) a 0.85 confidence score indicating the likelihood that the person is a female. Furthermore, the personalized-visual-content-display system 106 associates one or more of a succession of age ranges with the person based on the description(s) or the extracted item features. For example, the personalized-visual-content-display system 106 may associate one of the age ranges 25-40, 30-35, 27-33, etc. with a particular person. In some cases, the personalized-visual-content-display system 106 further generates a confidence score for each age range. The personalized-visual-content-display system 106 can infer which age range the person belongs based on such confidence scores.

As further shown in FIG. 7, the personalized-visual-content-display system 106 further performs the act 706 of accessing metadata of visual content items. In particular, the personalized-visual-content-display system 106 accesses text descriptions of visual content items 710a-710b within a collection of visual content items. Alternatively, the personalized-visual-content-display system 106 accesses keywords or codes as metadata corresponding to the visual content items 710a-710b.

After accessing the metadata, as further illustrated in FIG. 7, the personalized-visual-content-display system 106 performs the act 708 of retrieving the visual content item. Generally, the personalized-visual-content-display system 106 selects the visual content item from the visual content items 710a-710b of the collection of visual content items. In some embodiments, the personalized-visual-content-display system 106 utilizes a hash table 712 that maps characteristics of the person with word descriptors extracted from the metadata of the visual content items.

As part of building the hash table 712, in certain implementations, the personalized-visual-content-display system 106 determines hash keys for the characteristics and the word descriptors. Generally, the personalized-visual-content-display system 106 utilizes a hash function to convert input data (i.e., the characteristics and/or the word descriptors) into a hash key. In particular, in some embodiments, a hash key comprises a compressed numerical value. Furthermore, in one or more embodiments, the hash key comprises a numerical value of a fixed length. To illustrate, in some embodiments, the personalized-visual-content-display system 106 divides input data comprising the characteristics or the word descriptors into fixed sized data blocks. The personalized-visual-content-display system 106 inputs the data blocks into the hash function to generate the hash key.

To generate such hash keys, the personalized-visual-content-display system 106 may utilize various types of hash functions. For example, in one or more embodiments, the hash function comprises a message digest algorithm, a secure hash algorithm (SHA), a race integrity evaluation message digest, a whirlpool, or a Rivest-Shamier-Adleman (RSA) algorithm, and others.

To illustrate, as part of the act 708, the personalized-visual-content-display system 106 creates the hash table 712 that matches various characteristics or attributes with particular descriptors from the metadata. In some embodiments, the personalized-visual-content-display system 106 identifies several word descriptors corresponding to a single person. For example, the personalized-visual-content-display system 106 looks up word descriptors associated with each of the characteristics of the person. For instance, based on determining the person is likely female and approximately 31 years old—or within a particular age range—based on confidence scores, the personalized-visual-content-display system 106 identifies the word descriptors "woman, women, girl." As suggested above, the personalized-visual-content-display system 106 can use or look up any suitable word descriptors. Instead of "woman, women, girl," for instance, the personalized-visual-content-display system 106 may identify the word descriptors "female," "adult," and "woman" based on determining the person is likely female and a particular age or within a particular age range.

In one embodiment, the personalized-visual-content-display system 106 identifies candidate visual content items 714 that correspond to the identified word descriptors based on the searched characteristics. In particular, the personalized-visual-content-display system 106 filters the collection of visual content items using the identified word descriptors. In one or more embodiments, the personalized-visual-content-display system 106 ranks the candidate visual content items 714 based on relevance. For example, the personalized-visual-content-display system 106 ranks the candidate visual content items 714 based on the number of relevant word descriptors. The personalized-visual-content-display system 106 further selects the visual content item 710*a* from the candidate visual content items 714. For example, in one or more embodiments, the personalized-visual-content-display system 106 selects the highest ranked visual content item of the candidate visual content items 714.

In addition to the methods described above, in some embodiments, the personalized-visual-content-display system 106 also selects a visual content item for display based on a co-selected-nodal graph. FIG. 8 illustrates a series of acts 800 by which the personalized-visual-content-display system 106 selects a visual content item based on a co-selected-nodal graph in accordance with one or more embodiments. As illustrated in FIG. 8, the series of acts 800 includes an act 802 of accessing a co-selected-nodal graph, an act 804 of determining a commonly selected physical item, and an act 806 of selecting a visual content item.

The series of acts 800 includes the act 802 of accessing a co-selected-nodal graph. Generally, the co-selected-nodal graph illustrated in FIG. 8 indicates the likelihood, given the person already selected a physical item, that the person will select other particular physical items. For instance, the node 808 represents a physical item A that the person has already selected. Nodes 810*b*-810*d* correspond to physical items B-D, respectively. In one example, the co-selected-nodal graph comprises a co-bought graph that indicates the likelihood that the person will buy particular items together with the physical item A. In a further example, the co-selected-nodal graph comprises a co-view graph that indicates the likelihood that the person will view particular items together with the physical item A.

In some embodiments, the personalized-visual-content-display system 106 calculates a score for some nodes within the co-selected-nodal graph. For example, in one or more embodiments, the personalized-visual-content-display system 106 generates scores for the nodes 810*b*-810*d*. More specifically, the scores represent a relevance of each node to the physical item A represented by the node 808.

To calculate the relevance score for an individual node, the personalized-visual-content-display system 106 determines values associated with some or all of the nodes (within the co-selected-nodal graph) as part of an algorithm. In some such embodiments, the personalized-visual-content-display system 106 utilizes an algorithm that can be applied to the nodes and edges of the co-selected-nodal graph. For example, in some embodiments, the personalized-visual-content-display system 106 calculates and/or assigns a weight for each edge that connects one node to another node within the co-selected-nodal graph (or portion of the co-selected-nodal graph) as a function of one or more factors. Based on the determined weight for each edge within the co-selected-nodal graph (or portion of the co-selected-nodal graph), the personalized-visual-content-display system 106 generates a probability distribution indicating the likelihood that a person would navigate from one node to another node (i.e., select a corresponding physical item) within the co-selected-nodal graph. To do so, the personalized-visual-content-display system 106 runs several iterations of a random walk within the co-selected-nodal graph (or portion of the co-selected-nodal graph) to calculate the probability that a person would navigate from one node to another node based on the determined weight for each edge.

A person having ordinary skill in the art will recognize, however, that the personalized-visual-content-display system 106 may utilize any algorithm suitable for analyzing co-selected-nodal graph to quantify, define, and/or rank the relationships among nodes of the co-selected-nodal graph. For example, in some embodiments, the personalized-visual-content-display system 106 inputs weights associated with some or all of the edges from a generated co-selected-nodal graph into any algorithm that aggregates the effect of the connections among nodes to determine an overall relevance between two specific nodes. In particular, in some embodiments, the personalized-visual-content-display system 106 applies a DeepWalk algorithm, a PageRank random walk or a modified form of a PageRank (e.g., TrustRank) to the co-selected-nodal graph to calculate the relevance score for nodes within a portion or all of the co-selected-nodal graph.

To illustrate, in one or more embodiments, as part of performing the act 802, the personalized-visual-content-display system 106 generates a co-selected-nodal graph utilizing undirected edges. More specifically, and as illustrated, if the physical item A is frequently co-purchased with the items B-D, then the personalized-visual-content-display system 106 generates undirected edges between the node 808 and each of the nodes 810*b*-810*d*. In other embodiments, the personalized-visual-content-display system 106 generates the undirected edges based on determining that the physical item A is frequently co-viewed with the physical items B-D. In some cases, physical items that are co-viewed—such as one or more of the physical items B-D—comprise physical items that the person selects or interacts with, but not necessarily purchases, together. For instance, the physical items B-D may include physical items people habitually select together, but do not ultimately purchase. Examples of co-selected-nodal graphs include networks described in Jaewon Yang, et al. "Defining and Evaluating Network Communities based on Ground-truth," Proceedings of 2012 IEEE International Conference on Data Mining, arXiv:1205.6233 (2012), the entirety of which is incorporated by reference.

As further illustrated in FIG. 8, the series of acts 800 includes the act 804 of determining a commonly selected physical item. Generally, the personalized-visual-content-display system 106 analyzes the probability distribution generated utilizing the iterations of the random walk within the co-selected-nodal graph. In some embodiments, the personalized-visual-content-display system 106 determines the node associated with the highest score or probability as the commonly selected physical item. For instance, as illustrated in FIG. 8, the personalized-visual-content-display system 106 determines that the physical item B is the commonly selected physical item 804 based on the score associated with Item B. But the personalized-visual-content-display system 106 can analyze and compare scores for nodes representing other physical items within the co-selected-nodal graph consistent with the algorithms noted above (e.g., DeepWalk, PageRank).

After determining a commonly selected physical item, the series of acts 800 further includes the act 806 of selecting a visual content item. In particular, the personalized-visual-content-display system 106 selects a visual content item that displays the commonly selected physical item. For example, and as illustrated in FIG. 8, the personalized-visual-content-display system 106 selects a visual content item 812 displaying the physical item B, which is a pair of pants.

Figure 9:
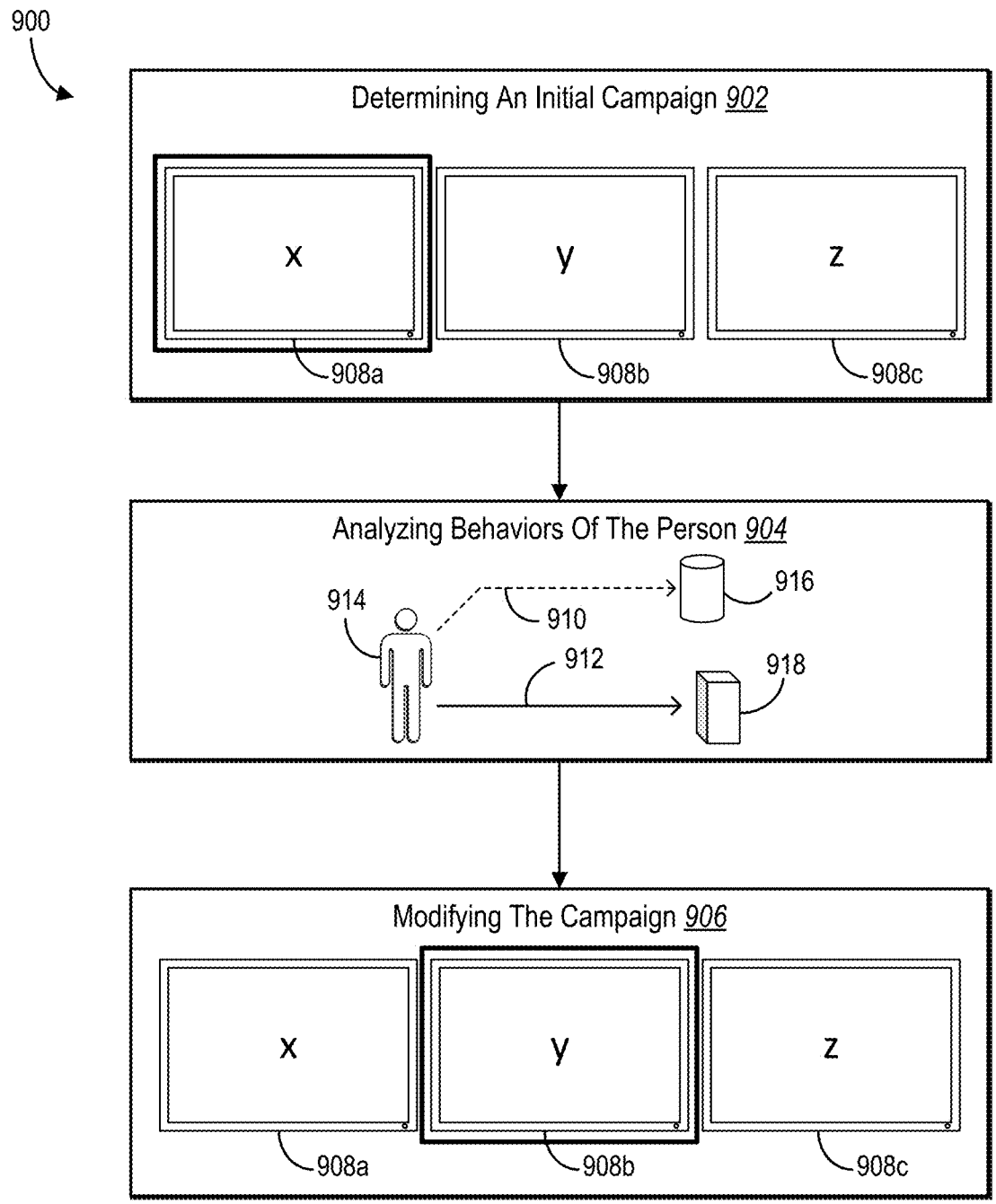
FIG. 9 illustrates an overview of the personalized-visual-content-display system modifying a digital content campaign based on analyzing behaviors of the person in accordance with one or more embodiments of the present disclosure.

As suggested above, in some embodiments, the personalized-visual-content-display system 106 updates a digital content campaign—such as by selecting a different visual content item from a different digital content campaign—in real time based on observed behaviors of a person. FIG. 9 illustrates a series of acts 900 for modifying a digital content campaign based on behaviors of the person in accordance with one or more embodiments. In particular, the series of acts 900 includes an act 902 of determining an initial campaign, an act 904 of analyzing behaviors of the person, and an act 906 of modifying the campaign.

As illustrated in FIG. 9, the personalized-visual-content-display system 106 performs the act 902 of determining an initial campaign. Generally, the personalized-visual-content-display system 106 identifies a digital content campaign as an initial campaign. In particular, digital content campaigns comprise organized assets for promoting and selling one or more physical items. For example, a digital content campaign may comprise digital content including visual content items. In one embodiment, the initial campaign refers to an individual visual content item. In further embodiments, the initial campaign refers to a digital content campaign comprising several organized assets.

In one or more embodiments, performing the act 902 comprises retrieving a visual content item for display via a particular digital-content-display device based on a set of physical items as well as a projected path of the person. In particular, the personalized-visual-content-display system 106 determines the initial campaign for a person based on the set of physical items. Furthermore, as part of the act 902, the personalized-visual-content-display system 106 determines a projected location of the person at a projected time based on locations associated with the person and/or the set of physical items. As illustrated in FIG. 9, the personalized-visual-content-display system 106 selects a campaign 908a of the campaigns 908a-908c as the initial campaign.

After determining an initial campaign, as further shown in FIG. 9, the personalized-visual-content-display system 106 performs the act 904 of analyzing behaviors of the person. In particular, the personalized-visual-content-display system 106 analyzes behaviors of the person after the person selected items within the set of physical items. Furthermore, in some embodiments, the personalized-visual-content-display system 106 generates predicted behaviors based on the set of physical items and locations of the person. The personalized-visual-content-display system 106 analyzes behaviors of a person 914 and determines whether the behaviors are consistent with predicted behaviors.

To illustrate, in some embodiments, the personalized-visual-content-display system 106 generates the projected path 910 for the person 914. More specifically, the personalized-visual-content-display system 106 predicts that the person 914 will travel along the projected path 910 to a digital-content-display device 916 displaying visual content item from the initial campaign. As part of performing the act 904 of analyzing behaviors of the person, the personalized-visual-content-display system 106 determines that the person 914 does not travel the projected path 910 but rather a realized path 912 toward a digital-content-display device 918.

As further illustrated in FIG. 9, the personalized-visual-content-display system 106 performs the act 906 of modifying the campaign. For instance, in one or more embodiments, based on the person 914 traveling along the realized path 912 and not the projected path 910, the personalized-visual-content-display system 106 determines to modify the campaign. As illustrated in FIG. 9, the personalized-visual-content-display system 106 determines to select the campaign 908b instead of the initially selected campaign 908a of the campaigns 908a-908c.

In one example, the personalized-visual-content-display system 106 performs the act 906 of modifying the campaign by selecting a campaign related to physical items in a proximity to the digital-content-display device 918. In further embodiments, the personalized-visual-content-display system 106 utilizes a bandit algorithm to modify the campaign based on factors including the realized path 912, the location of the digital-content-display device 918, and other factors. For instance, the personalized-visual-content-display system 106 utilizes multi-armed-bandit algorithms to select the campaign 908b. Examples of multi-armed-bandit algorithms utilized by the personalized-visual-content-display system 106 include an Epsilon-Greedy algorithm, an upper confidence bound algorithm, and a Thompson sampling algorithm. Example algorithms are further described in Aleksandrs Slivkins, "Introduction to Multi-Armed Bandits," arXiv:1904.0727272v5 (30 Sep. 2019), the entirety of which is incorporated by reference.

As described, the personalized-visual-content-display system 106 performs the act 906 before a point of sale within the physical space. In particular, the personalized-visual-content-display system 106 performs the act 906 of modifying the campaign while the person travels through the physical space. Additionally, or alternatively, in some cases, the personalized-visual-content-display system 106 performs the act 906 of modifying the campaign based on analyzing behaviors of the person at a point of sale. In particular, the personalized-visual-content-display system 106 modifies the campaign for future persons in the physical space based on determining the effectiveness of the initial campaign presented to the person.

Figure 10:
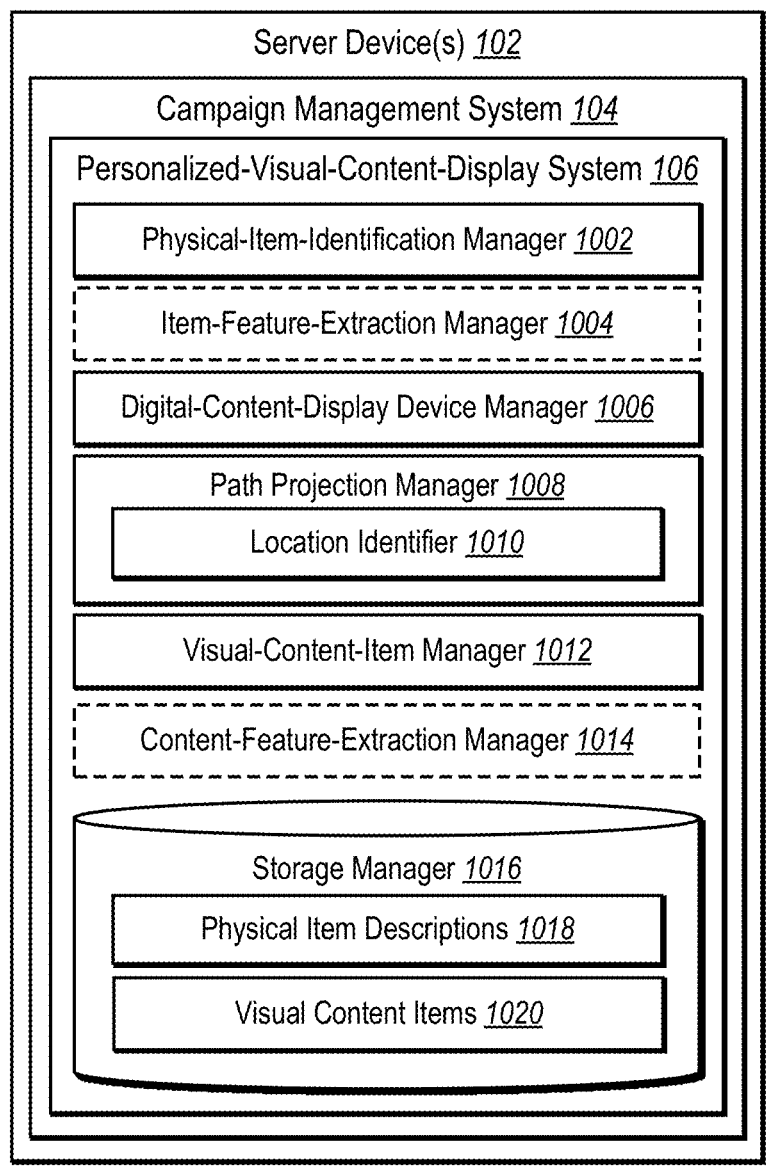
FIG. 10 illustrates a schematic diagram of an example architecture of the personalized-visual-content-display system in accordance with one or more embodiments of the present disclosure.

FIG. 10 provides additional detail regarding various components and capabilities of the campaign management system 104 and the personalized-visual-content-display system 106. Generally, FIG. 10 illustrates the personalized-visual-content-display system 106 implemented by the campaign management system 104. In particular, as illustrated in FIG. 10, the personalized-visual-content-display system 106 includes, but is not limited to a physical-item-identification manager 1002, an item-feature-extraction manager 1004, a digital-content-display device manager 1006, a path projection manager 1008, a visual-content-item manager 1012, a content-feature-extraction manager 1014, and a storage manager 1016.

As mentioned, the personalized-visual-content-display system 106 includes the physical-item-identification manager 1002. Generally, the physical-item-identification manager 1102 identifies physical items within a set of physical items. In particular, the physical-item-identification manager 1002 communicates with sensors located within the physical space to retrieve sensor data. In one example, the physical-item-identification manager 1002 accesses data from RFID sensors located within the physical space. The physical-item-identification manager 1002 identifies co-located physical items that travel together through the physical space. The personalized-visual-content-display system 106 further determines the identities of the physical items by determining identifiers from signals associated with the physical items.

As illustrated in FIG. 10, in some embodiments, the personalized-visual-content-display system 106 also includes the item-feature-extraction manager 1004. More specifically, the item-feature-extraction manager 1004 identifies a set of descriptions corresponding to the set of physical items based on signals from the set of physical items. The item-feature-extraction manager 1004 utilizes a language-embedding model to extract a set of item features from the set of descriptions.

As further illustrated in FIG. 10, the personalized-visual-content-display system 106 includes the digital-content-display device manager 1006. Generally, the digital-contentdisplay device manager 1006 manages a network of digital-content-display devices within a physical location. In one embodiment, the digital-content-display device manager 1006 identifies a digital-content-display device in proximity to a projected location of the person. Furthermore, the digital-content-display device manager 1006 provides, to a selected digital-content-display device, visual content items to display at a projected time.

As further shown in FIG. 10, the personalized-visual-content-display system 106 also includes the path projection manager 1008. The path projection manager 1008 analyzes determined locations associated with a person or set of physical items and/or a set of physical items to generate a projected path of the person within the physical space.

In some embodiments, the path projection manager 1008 also includes a location identifier 1010. The location identifier 1010 identifies a specific projected location of the person based on the projected path. Furthermore, the location identifier 1010 also determines a projected time at which the person will arrive at the projected location. In some embodiments, the location identifier 1010 analyzes locations corresponding to the set of physical items and travel times of the set of physical items between locations to predict the projected location and the projected time.

As further shown in FIG. 10, the personalized-visual-content-display system 106 illustrated in FIG. 10 also includes the visual-content-item manager 1012. The visual-content-item manager 1012 generally analyzes, manages, and sends visual content items to digital-content-display devices located within the physical space. More specifically, the visual-content-item manager 1012 communicates with the storage manager 1016 to access a collection of visual content items (i.e., visual content items 1020). The visual-content-item manager 1012 also manages metadata associated with visual content items. In further embodiments, the visual-content-item manager selects the visual content item(s) to display via a selected digital-content-display device.

Furthermore, in one or more embodiments, the personalized-visual-content-display system 106 includes the content-feature-extraction manager 1014. Generally, the content-feature-extraction manager 1014 extracts a set of content features from visual content items. In particular, the content-feature-extraction manager 1014 accesses and utilizes an image-embedding model to generate a content embedding for each visual content item within a collection of visual content items. In one or more embodiments, the content-feature-extraction manager 1014 utilizes the image-embedding model to analyze metadata associated with visual content items.

In some embodiments, the storage manager 1016 includes physical item descriptions 1018 and visual content items 1020. In some embodiments, the physical item descriptions 1018 comprises a repository of physical item descriptions mapped to physical item identifiers. More specifically, the physical item descriptions 1018 include descriptions for physical items within a physical space. The visual content items 1020 comprise a collection of visual content items that may potentially be selected for display via digital-content-display devices within a physical space. Furthermore, the visual contentment items 1020 comprises and associated metadata.

Figure 11:
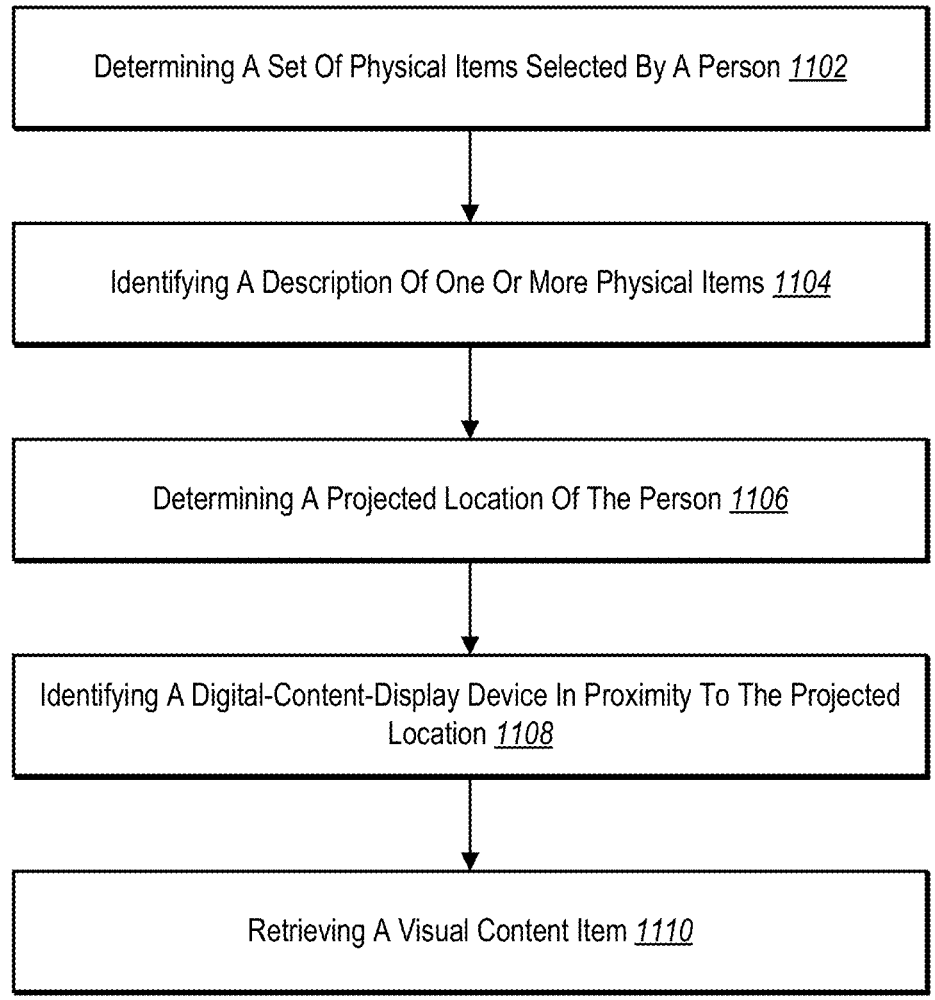
FIG. 11 illustrates a series of acts for personalizing visual content for display on a digital-content-display device by mapping visual content to physical items selected by a person and displaying the visual content on a selected digital-content-display device nearby a projected location of the person in accordance with one or more embodiments of the present disclosure.

FIGS. 1-10, the corresponding text, and the examples provide a number of different methods, systems, devices, and non-transitory computer-readable media of the personalized-visual-content-display system 106. In addition to the foregoing, one or more embodiments can also be described in terms of flowcharts comprising acts for accomplishing the particular result, as shown in FIG. 11. The acts illustrated in FIG. 11 may be performed with more or fewer acts. Further, the illustrated acts may be performed in different orders. Additionally, the acts herein may be repeated or performed in parallel with one another or in parallel with different instances of the same or similar acts.

FIG. 11 illustrates a flowchart of a series of acts 1100 for retrieving a visual content item. In particular, the series of acts 1100 includes an act 1102 of determining a set of physical items selected by a person, an act 1104 of identifying a description of one or more physical items, an act 1106 of determining a projected location of the person, an act 1108 of identifying a digital-content-display device in proximity to the projected location, and an act 1110 of retrieving a visual content item.

As illustrated in FIG. 11, the series of acts 1100 includes the act 1102 of determining a set of physical items selected by a person. In particular, the act 1102 comprises determining a set of physical items selected by a person within a physical space based on signals from the set of physical items. In one or more embodiments, the act 1102 further comprises determining the set of physical items by: receiving, from a sensor of a container associated with the person, indications of electromagnetic signals received by the sensor from the set of physical items located in the container; and determining identifiers for the set of physical items prior to purchase based on the indications of electromagnetic signals.

In some embodiments, the act 1102 further comprises an act of determining a physical item of the set of physical items by: receiving, from a sensor associated with an item-holding structure, an indication of a signal indicating that the physical item has been removed from the item-holding structure; and determining an identifier of the physical item prior to purchase based on the indication of the signal.

Additionally, in some embodiments, the act 1102 further comprises an act of determining a physical item of the set of physical items by: receiving, from a radio-frequency identification (RFID) reader, signal measurements reflected by a tag affixed to the physical item, wherein the signal measurements comprise signal power, phase angle, and frequency shift; determining one or more motion events corresponding to the physical item based on the signal measurements; and identifying the physical item as an item of interest by the person based on the one or more motion events. In one or more embodiments, the act 1102 further comprises an act of determining the projected time by determining the projected location at which the person will arrive within a time period of a threshold duration.

In some embodiments, the act 1102 further comprises an act of determining the set of physical items by: receiving, from one or more electromagnetic sensors at various locations within the physical space, indications of electromagnetic signals emitted by electromagnetic tags associated with the set of physical items; and determining identifiers for the set of physical items prior to purchase based on the indications of electromagnetic signals.

The series of acts 1100 illustrated in FIG. 11 further comprises the act 1104 of identifying a description of one or more physical items. In particular, the act 1104 comprises identifying a description of one or more physical items from the set of physical items selected by the person.

In some embodiments, the act 1104 comprises identifying a set of descriptions for a set of physical items selected by a person within a physical space based on electromagnetic signals from tags associated with the set of physical items.

In one or more embodiments, the act 1104 further comprises extracting a set of item features from the set of descriptions.

As further illustrated in FIG. 11, the series of acts 1100 includes the act 1106 of determining a projected location of the person. In particular, the act 1106 comprises determining a projected location of the person within the physical space at a projected time. In one or more embodiments, the act 1106 further comprises the act of determining the projected location of the person within the physical space at the projected time by: generating a projected path of the person within the physical space based on detected locations at which the person interacted with or otherwise selected a physical item from the set of physical items; and determining the projected location at which the person will arrive at the projected time based on the projected path. In one or more embodiments, the act 1106 further comprises an act of determining the projected time by determining a travel time to the projected location based on the locations corresponding to the electromagnetic signals and travel times between the locations. In further embodiments, the act 1106 further comprises an act of determining the projected time by determining the projected location at which the person will arrive within a time period of a threshold duration.

In one or more embodiments, the act 1106 further comprises the act of determining the projected location of the person within the physical space by: receiving, from one or more radio-frequency identification (RFID) sensors within the physical space, locations corresponding to the set of physical items over a period of time; accessing historical location data comprising historical locations associated with historical persons within the physical space; analyzing the historical location data to determine historical paths comprising historical locations corresponding to the locations corresponding to the set of physical items; and determining the projected location based on the historical paths.

The series of acts 1100 further comprises the act 1108 of identifying a digital-content-display device in proximity to the projected location. In particular, the act 1108 comprises identifying a digital-content-display device in proximity to the projected location of the person within the physical space.

In further embodiments, the act 1108 further comprises identify a digital-content-display device in proximity to a projected location of the person within the physical space by: generating a projected path of the person within the physical space based on locations corresponding to the electromagnetic signals from the tags associated with the set of physical items; and determining the projected location at which the person will arrive at a projected time based on the projected path. Furthermore, in one or more embodiments, the act 1108 comprises an act of generating the projected path by: identifying the locations corresponding to the electromagnetic signals by tracking detected locations of one or more physical items of the set of physical items indicated by one or more sensors detecting the electromagnetic signals; predicting one or more additional physical items the person is likely to select based on the set of physical items; and generating the projected path based on the detected locations of the one or more physical items and one or more locations for the one or more additional physical items.

The series of acts 1100 illustrated in FIG. 11 also includes the act 1110 of retrieving a visual content item. In particular, the act 1110 comprises retrieving, for display via the digital-content-display device, a visual content item to be viewed by the person at the projected location and at the projected time based on the visual content item corresponding to the description of the one or more physical items from the set of physical items. In one or more embodiments, the act 1110 further comprises the act of retrieving the visual content item by: identifying, within a co-selected-nodal graph, one or more nodes representing the one or more physical items based on the description of the one or more physical items; determining, from the one or more nodes within the co-selected-nodal graph, probabilities that other physical items are selected together with the one or more physical items; based on the probabilities determined from the co-selected-nodal graph, determining a commonly selected physical item; and determining the visual content item displays the commonly selected physical item.

In one or more embodiments, the act 1110 further comprises retrieving, for display via the digital-content-display device from the collection of visual content items, a visual content item to be viewed by the person at the projected location and at the projected time by mapping a set of content features for the visual content item to the set of item features.

In some embodiments, the series of acts 1100 further comprises additional acts of identifying the description of the one or more physical items by identifying a set of descriptions corresponding to the set of physical items based on the signals from the set of physical items; extracting, utilizing a language-embedding model, a set of item features from the set of descriptions; and retrieving the visual content item based on a set of content features for the visual content item corresponding to the set of item features.

In further embodiments, the series of acts 1100 comprises additional acts of determining one or more characteristics of the person as comprising at least one of an age, gender, spend level, size, or shopping purpose based on the set of physical items; and retrieving the visual content item based on the one or more characteristics of the person corresponding to the visual content item.

In one or more embodiments, the series of acts 1100 comprises additional acts of extracting the set of item features from the set of descriptions by generating, utilizing a language-embedding model, item embeddings for the set of physical items from the set of descriptions; generating, utilizing an image-embedding model, a content embedding for the visual content item from metadata associated with the visual content item; and mapping the set of content features for the visual content items to the set of item features by determining measures of similarity among the content embedding and the item embeddings based on embedding distances within a common embedding space among the content embedding and the item embeddings.

In further embodiments, the series of acts 1100 comprises additional acts of determining that the person moved a first physical item to an area within the physical space based on a first electromagnetic signal from the first physical item; determine that the person did not move a second physical item to the area within the physical space based on a second electromagnetic signal from the second physical item; and determining the first physical item is part of the set of physical items and the second physical item is not part of the set of physical items based on the person moving the first physical item to the area and not moving the second physical item to the area.

Additionally, in one or more embodiments, the series of acts 1100 further comprises the acts of determining that the person manipulated an additional physical item based on an electromagnetic signal from the additional physical item; extracting a subset of item features from a description of the additional physical item; and retrieving the visual content item based further on the subset of item features by mapping the subset of item features and the set of item features to the set of content features.

The acts and algorithms shown in acts 206, 208, and 210 in FIG. 2 and/or the acts 606 and 608 of FIG. 6 comprise supporting structure for performing a step for displaying a visual content item at a digital-content-display device near a projected location of the person within the physical space based on the signals and the item features.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
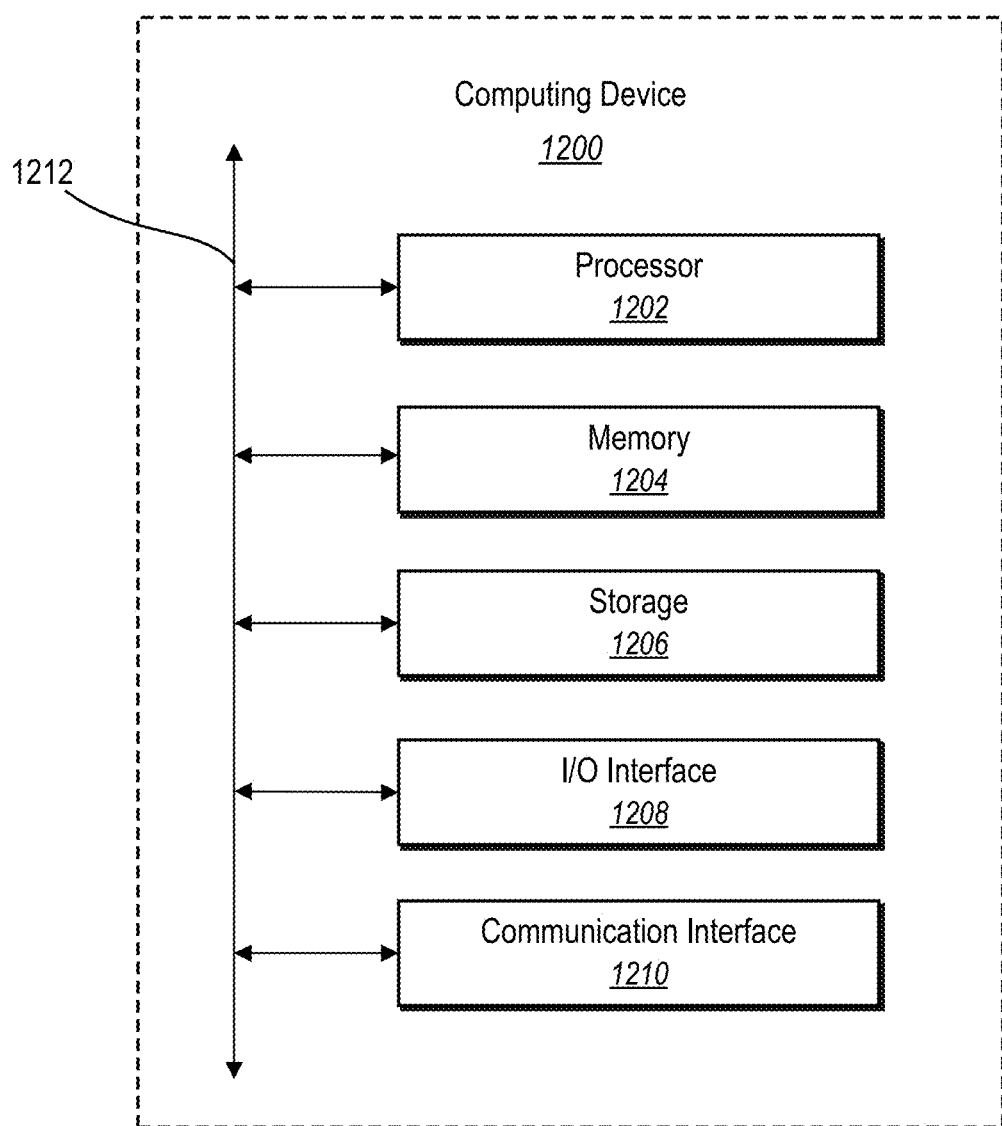
FIG. 12 illustrates a block diagram of an example computing device in accordance with one or more embodiments of the present disclosure.

FIG. 12 illustrates a block diagram of a computing device 1200 that may be configured to perform one or more of the processes described above. One will appreciate that one or more computing devices such as the computing device 1200 may implement the personalized-visual-content-display system 106 and the campaign management system 104. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for dynamically modifying workflows, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions for performing the methods described herein.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example, and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The invention claimed is:

1. A non-transitory computer readable medium for providing personalized visual content items for display on digital-content-display devices, the non-transitory computer readable medium comprising instructions that, when executed by at least one processor, cause a computing device to:
   determine a set of physical items selected by a person within a physical space based on signals from the set of physical items;
   identify a description of one or more physical items from the set of physical items selected by the person;
   determine a projected location of the person within the physical space at a projected time;
   identify a digital-content-display device within a threshold distance of the projected location of the person within the physical space; and
   retrieve, for display via the digital-content-display device, a visual content item to be viewed by the person at the projected location and at the projected time based on the visual content item corresponding to the description of the one or more physical items from the set of physical items.

2. The non-transitory computer readable medium as recited in claim 1, further comprising instructions that, when executed by the at least one processor, cause the computing device to determine the set of physical items by:
   receiving, from a sensor of a container associated with the person, indications of electromagnetic signals received by the sensor from the set of physical items located in the container; and
   determining identifiers for the set of physical items prior to purchase based on the indications of electromagnetic signals.

3. The non-transitory computer readable medium as recited in claim 1, further comprising instructions that, when executed by the at least one processor, cause the computing device to determine a physical item of the set of physical items by:

receiving, from a sensor associated with an item-holding structure, an indication of a signal indicating that the physical item has been removed from the item-holding structure; and determining an identifier of the physical item prior to purchase based on the indication of the signal.

4. The non-transitory computer readable medium as recited in claim 1, further comprising instructions that, when executed by the at least one processor, cause the computing device to determine a physical item of the set of physical items by:

receiving, from a radio-frequency identification (RFID) reader, signal measurements reflected by a tag affixed to the physical item, wherein the signal measurements comprise signal power, phase angle, and frequency shift;

determining one or more motion events corresponding to the physical item based on the signal measurements; and identifying the physical item as an item of interest by the person based on the one or more motion events.

5. The non-transitory computer readable medium as recited in claim 1, further comprising instructions that, when executed by the at least one processor, cause the computing device to:

identify the description of the one or more physical items by identifying a set of descriptions corresponding to the set of physical items based on the signals from the set of physical items;

extract, utilizing a language-embedding model, a set of item features from the set of descriptions; and retrieve the visual content item based on a set of content features for the visual content item corresponding to the set of item features.

6. The non-transitory computer readable medium as recited in claim 1, further comprising instructions that, when executed by the at least one processor, cause the computing device to:

determine one or more characteristics of the person as comprising at least one of an age, gender, spend level, size, or shopping purpose based on the set of physical items; and retrieve the visual content item based on the one or more characteristics of the person corresponding to the visual content item.

7. The non-transitory computer readable medium as recited in claim 1, further comprising instructions that, when executed by the at least one processor, cause the computing device to determine the projected location of the person within the physical space at the projected time by:

generating a projected path of the person within the physical space based on detected locations at which the person interacted with or otherwise selected a physical item from the set of physical items; and determining the projected location at which the person will arrive at the projected time based on the projected path.

8. The non-transitory computer readable medium as recited in claim 1, further comprising instructions that, when executed by the at least one processor, cause the computing device to retrieve the visual content item by:

identifying, within a co-selected-nodal graph, one or more nodes representing the one or more physical items based on the description of the one or more physical items;

determining, from the one or more nodes within the co-selected-nodal graph, probabilities that other physical items are selected together with the one or more physical items;

based on the probabilities determined from the co-selected-nodal graph, determining a commonly selected physical item; and determining the visual content item displays the commonly selected physical item.

9. A system comprising:

at least one memory device comprising descriptions of physical items, a collection of visual content items, and corresponding sets of content features for the collection of visual content items; and at least one server device configured to cause the system to:

identify a set of descriptions for a set of physical items selected by a person within a physical space based on electromagnetic signals from tags associated with the set of physical items;

extract a set of item features from the set of descriptions;

identify a digital-content-display device within a threshold distance of a projected location of the person within the physical space by:

generating a projected path of the person within the physical space based on locations corresponding to the electromagnetic signals from the tags associated with the set of physical items; and determining the projected location at which the person will arrive at a projected time based on the projected path; and retrieve, for display via the digital-content-display device from the collection of visual content items, a visual content item to be viewed by the person at the projected location and at the projected time by mapping a set of content features for the visual content item to the set of item features.

10. The system as recited in claim 9, wherein the at least one server device is further configured to cause the system to:

extract the set of item features from the set of descriptions by generating, utilizing a language-embedding model, item embeddings for the set of physical items from the set of descriptions;

generate, utilizing an image-embedding model, a content embedding for the visual content item from metadata associated with the visual content item; and map the set of content features for the visual content item to the set of item features by determining measures of similarity among the content embedding and the item embeddings based on embedding distances within a common embedding space among the content embedding and the item embeddings.

11. The system as recited in claim 9, wherein the at least one server device is further configured to cause the system to generate the projected path by:

identifying the locations corresponding to the electromagnetic signals by tracking detected locations of one or more physical items of the set of physical items indicated by one or more sensors detecting the electromagnetic signals;

predicting one or more additional physical items the person is likely to select based on the set of physical items; and generating the projected path based on the detected locations of the one or more physical items and one or more locations for the one or more additional physical items.

12. The system as recited in claim 9, wherein the at least one server device is further configured to cause the system to determine the projected time by determining a travel time to the projected location based on the locations corresponding to the electromagnetic signals and travel times between the locations.

13. The system as recited in claim 9, wherein the at least one server device is further configured to cause the system to determine the projected time by determining the projected location at which the person will arrive within a time period of a threshold duration.

14. The system as recited in claim 9, wherein the at least one server device is further configured to cause the system to determine the set of physical items by:

receiving, from one or more electromagnetic sensors at various locations within the physical space, indications of electromagnetic signals emitted by electromagnetic tags associated with the set of physical items; and determining identifiers for the set of physical items prior to purchase based on the indications of the electromagnetic signals.

15. The system as recited in claim 9, wherein the at least one server device is further configured to cause the system to determine the projected location of the person within the physical space by:

receiving, from one or more radio-frequency identification (RFID) sensors within the physical space, locations corresponding to the set of physical items over a period of time;

accessing historical location data comprising historical locations associated with historical persons within the physical space;

analyzing the historical location data to determine historical paths comprising historical locations corresponding to the locations corresponding to the set of physical items; and determining the projected location based on the historical paths.

16. The system as recited in claim 9, wherein the at least one server device is further configured to cause the system to:

determine that the person moved a first physical item to an area within the physical space based on a first electromagnetic signal from the first physical item;

determine that the person did not move a second physical item to the area within the physical space based on a second electromagnetic signal from the second physical item; and determine the first physical item is part of the set of physical items and the second physical item is not part of the set of physical items based on the person moving the first physical item to the area and not moving the second physical item to the area.

17. The system as recited in claim 9, wherein the at least one server device is further configured to cause the system to:

determine that the person manipulated an additional physical item based on an electromagnetic signal from the additional physical item;

extract a subset of item features from a description of the additional physical item; and retrieve the visual content item based further on the subset of item features by mapping the subset of item features and the set of item features to the set of content features.

18. A computer-implemented method comprising:

determining a set of physical items selected by a person within a physical space based on signals from the set of physical items;

identifying a description of one or more physical items from the set of physical items selected by the person;

determining a projected location of the person within the physical space at a projected time;

identifying a digital-content-display device within a threshold distance of the projected location of the person within the physical space; and retrieving, for display via the digital-content-display device, a visual content item to be viewed by the person at the projected location and at the projected time based on the visual content item corresponding to the description of the one or more physical items from the set of physical items.

19. The computer-implemented method as recited in claim 18, further comprising determining the set of physical items by receiving, from a sensor of a container associated with the person, indications of radio-frequency identification (RFID) signals received by the sensor from the set of physical items located in the container.

20. The computer-implemented method as recited in claim 18, further comprising determining the set of physical items by receiving the signals from attached tags affixed to the set of physical items that have been picked up and set down by the person.

* * * * *